United States Patent [19]

Chen et al.

[11] Patent Number: 5,666,360
[45] Date of Patent: Sep. 9, 1997

[54] MULTICAST ROUTING IN SELF-ROUTING MULTISTAGE NETWORKS

[75] Inventors: Xiaoqiang Chen, Eatontown; Vijay P. Kumar, Freehold, both of N.J.; Cauligi S. Raghavendra, Pullman, Wash.

[73] Assignee: Lucent Technologies Inc., Murray Hill, N.J.

[21] Appl. No.: 491,426

[22] Filed: Jun. 16, 1995

Related U.S. Application Data

[63] Continuation-in-part of Ser. No. 254,089, Jun. 6, 1994.
[51] Int. Cl.⁶ .................................................. H04L 12/58
[52] U.S. Cl. ................................. 370/390; 370/392
[58] Field of Search .................. 370/60.1, 60, 94.1, 370/94.2, 94.3, 53, 54, 55, 56, 58.1, 58.2, 58.3, 93, 352, 356, 354, 355, 357, 360, 361, 367, 369, 370, 372, 375, 376, 377, 380, 387, 388, 389, 390, 392, 395, 397, 398, 399, 406, 407, 403, 409, 425, 434, 432; 340/825, 800, 825.79

[56] References Cited

U.S. PATENT DOCUMENTS 5,371,735  12/1994  Denneau et al. ........................ 370/54
5,471,623  11/1995  Napolitano, Jr. ....................... 370/54

Primary Examiner—Dang Ton

[57] ABSTRACT

An apparatus and method is described for multicasting an inlet data cell, received as part of a multicast request, through a self-routing multistage routing network. Two algorithms are disclosed which use at most three passes to perform any arbitrary multicast. In the first pass, data is usually routed from the source to a set of consecutive outputs. These outputs are used as inputs in the second pass for routing to the destination cubes, and in some cases, a third pass can be used to route the remaining cubes. Since these cubes constitute a partition of the original multicast set, the multicast is completed when each of the cubes has been successfully routed. The routing algorithms guarantee that those cubes used in each pass through the network do not have internal blocking. The criterion to select a multicast routing algorithm for a particular application is to keep a appropriate balance between the control simplicity, the number of passes and the number of internal links used by the algorithm.

13 Claims, 13 Drawing Sheets

PARTITION:
{4,6,12,14}
{7,23}
{25,27}
{28}
{8}

MULTICAST ROUTING IN SELF-ROUTING MULTISTAGE NETWORKS

RELATED APPLICATION

The present patent application is a continuation-in-part of U.S. patent application, Ser. No. 08/254, 089, filed Jun. 6, 1994, and entitled MULTICAST ROUTING IN SELF-ROUTING MULTISTAGE NETWORKS, wherein the present application additionally discloses algorithms for improving the efficiency of multicast routing.

TECHNICAL FIELD

This invention relates to a method and apparatus for providing self-routing in multistage networks and, more particularly, for providing multicast routing capabilities in such networks.

BACKGROUND OF THE INVENTION

The goal of Asynchronous Transfer Mode (ATM) is to provide an integrated transport vehicle for a wide range of applications so that improved resource efficiency can be achieved. Many of these applications require multicast (one-to-many) connections in addition to conventional unicast (one-to-one) connections. Therefore, the capability of handling multicast connections is an essential ingredient to any switch architecture design and implementation aimed at ATM networks. Many of the switch architectures found in the prior art employ multistage interconnection networks (MINs), either buffered or not, as a core "routing network" (RN) for the support of unicast connections. To provide the multicast capability, two alternatives are possible. The first approach is to add a "copy network" (CN) at the front of an RN. The function of CN, as its name implies, is to replicate the cell to obtain the number of copies requested by a given multicast connection. Those copies will then be transmitted through the RN to the desired outlets. The design of CN may be quite different from that of RN, and requires extra complex components. This is especially the case when designing a CN which can avoid conflicts inside an RN.

Instead of designing a new CN, the second approach is to exploit the inherent multicast capability of an RN by recycling the cell at the output of an RN to its input to generate extra copies. This approach is termed a "recursive scheme," since it simulates the logical function of a CN by using the RN recursively. This approach is advantageous when a routing network has already been implemented, since it does not require hardware modifications. The simplicity of the network control algorithm for serf-routing and hardware implementation makes this scheme attractive. The general scheme is illustrated in FIG. 1 where a self-routing multistage routing network (RN) has expanders and concentrators which enable outlets (O) to be connected to inlets (I) through external links (L). Such a routing network may be based on a Log N-stage banyan network.

While a recursive routing algorithm has been proposed by others (see R. Cusani and F. Sestini, "A recursive multistage structure for multicast ATM switching," *IEEE INFOCOM '91*, Apr. 9–11, 1991, pp. 171–180), such recursive routing algorithms have not overcome the problem of blocking in multicast connections.

SUMMARY OF THE INVENTION

The present invention teaches an apparatus and method for multicasting a received inlet data cell, received as part of an original multicast request, through a serf-routing multistage switching or routing network RN to desired outlets when most original multicast requests cannot be multicasted through the network in a single pass without causing any undesired outlet to receive the cell. The original multicast request D, defining a set of desired outlets, is decomposed into one or more intermediate multicast requests, each intermediate multicast request being a unique subset of the original multicast request which enables a non-blocking, self-routing distribution to a subset of the desired outlets of the original multicast request in one or two passes through the network. The invention then generates a non-blocking multicast tree based on the intermediate multicast requests and routes the received inlet data cell to the desired outlets.

The invention decomposes the original multicast request and generates a non-blocking multicast tree using a cube routing algorithm, a copy routing algorithm, or a combined routing algorithm, which is a combination of the copy and cube routing algorithms.

The cube routing algorithm decomposes the original multicast request into a plurality of cubes, each cube identifying a set of desired network outlets to which a received data cell can be routed in a single pass through the network; generates a non-blocking multicast tree based on the plurality of cubes; and routes the received inlet data cell to the desired outlets. The cube routing algorithm is recursive. The "distance" between two cubes gives rise to a necessary and sufficient condition required in order to achieve a non-blocking property of the cube routing algorithm.

The copy routing algorithm decomposes the original multicast request by (a) generating $2^{a_i}$ copies of the inlet data cell at contiguous outlets and (b) for each of the copies, addressing a desired outlet of D in either a decreasing or increasing order; and generates a non-blocking multicast tree by repeating steps (a) and (b), for any $a_i \neq 0$, where the multicast request is defined as $|D| = a_{n-1}, a_{n-2} \ldots a_0$.

In the combined routing algorithm, we generate $2^j$ copies of the inlet data cell where $$j = \max\{i, |a_i \neq 0, 0 \leq i \leq n-1\}$$

and then decompose the original multicast request and generate a non-blocking multicast tree using the cube routing algorithm previously described.

The present invention addresses two conflicting requirements: (1) minimization of the number of passes through the network and (2) minimization of the number of internal links (network resources) used.

Additionally, two algorithms are disclosed which use at most three passes to perform any arbitrary multicast. In the first pass, data is usually routed from the source to a set of consecutive outputs. These outputs are used as inputs in the second pass for routing to the destination cubes, and in some cases, a third pass can be used to route the remaining cubes. Since these cubes constitute a partition of the original multicast set, the multicast is completed when each of the cubes has been successfully routed. The routing algorithms guarantee that those cubes used in each pass through the network do not have internal blocking. The criterion to select a multicast routing algorithm for a particular application is to keep an appropriate balance between the control simplicity, the number of passes and the number of internal links used by the algorithm.

DETAILED DESCRIPTION

1. Multicast Capability of Banyan Networks
1.1 Multicast routing tag scheme

Figure 2:
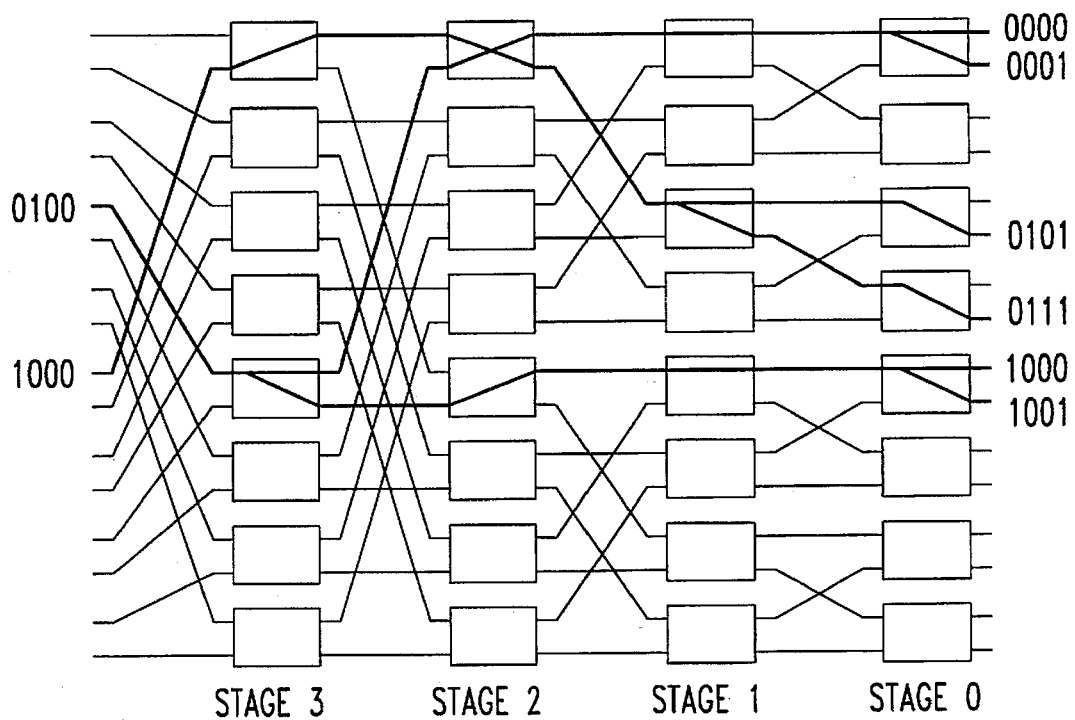
FIG. 2 illustrates a prior art routing network based on a Log N-stage (N=16, 4-stage) banyan network.

With reference to FIG. 2, we, illustratively, consider an $N=2^n$ inlet/outlet banyan network with n=4 stages, each stage having N/2 (2×2) switching elements (SEs) such as the PHOENIX switch described by V. P. Kumar et at. in "Phoenix: A building block for fault-tolerant broadband packet switches," *IEEE GLOBECOM '91*, December 1991. A 2×2 SE can be routed to one of the two, or to both, of the SEs to which it connects to support the multicast capability. The uncertainty that each SE has to make a decision with three possibilities is Log 3=1.585, which implies that the minimum multicast routing tag contained in a cell for each SE on the path is 2 bits, making the total bits for n SEs equal to 2n. One scheme to construct a multicast routing tag is to specify the routing tag by $\{R,M\}$, where $R=r_{n-1} \ldots r_1 r_0$ contains the routing information and $M=m_{n-1} \ldots m_1 m_0$ contains the multicast information. To interpret the multicasting tag $\{R,M\}$, an SE at stage $i(0 \leq i \leq n-1)$ in the network must examine $r_i$ and $m_i$. (For convenience, the stages are numbered as 0, 1, ..., n−1 from the rightmost to the leftmost.) If $m_i=0$, the normal unicast routing is performed according to the value of $r_i$. If $r_i=0$, then the unicast routing is to the upper output. If $r_i=1$, then the unicast routing is to the lower output. If $m_i=1$, $r_i$ is ignored and the proper upper or lower broadcast is performed depending on the link at which the cell arrived.

In what follows, let $D=d_1,d_2,\ldots,d_k$ be the set of desired outlet addresses of a multicast connection, and $|D|$ be the cardinality of D. We assume that $k=|D|$ has a truncated binomial distribution of order N, i.e., $$p_k = \frac{[N_k]p^k(1-p)^{N-k}}{1-(1-p)^N}, 1 \leq k \leq N \quad (1)$$

where p is the probability that an outlet belongs to a given multicast connection. In the sequel, we shall use either decimal or binary representation of an outlet or inlet address, depending on the context.

1.2 Multicast capability

Obviously, the multicast routing tag scheme described in the previous section is not capable of performing any arbitrary multicast connection request. Two questions, however, remain to be answered. The first one is how many multicast connections can be routed through the network in a single pass. The second one is concerned with the conditions under which a multicast connection can be routed through the network in a single pass. The answer to the first question is the subject of this section. The answer to the second question is described in the following section.

Since each outlet may be in a given multicast connection or not, thus there are $2^{2^n}$ possible multicast connections. On the other hand, since the network has n stages, and the SE in each stage can be individually set to one of three states, there are $3^n$ different ways to set those SEs. Each distinct setting results in a distinct multicast connection. If we assume a random outlet distribution (i.e., balanced traffic), the probability that a given multicast connection can be realized in a single pass through the network is therefore $$P(n) = \frac{3^n}{2^{2^n}}$$

Figure 3:
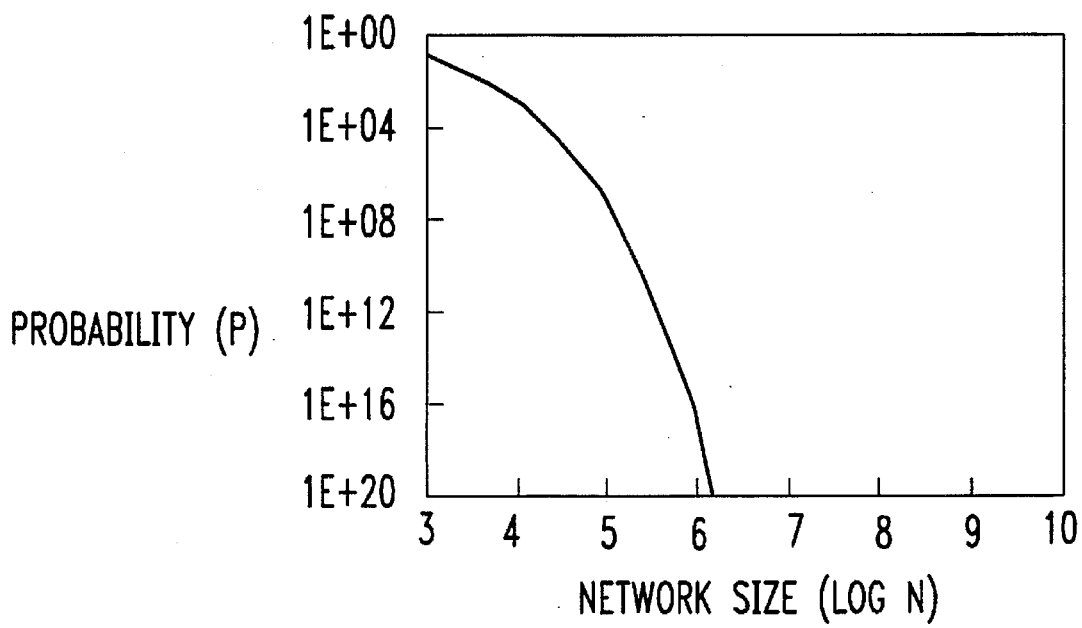
FIG. 3 shows a graph of a single-pass multicast probability (P) of banyan networks.

As shown in FIG. 3, when n=LogN becomes larger, P(n) approaches zero very fast. (Note that, for convenience, in the figures containing graphs, we draw continuous curves rather than a sequence of points.) This clearly demonstrates that the multicast capabilities of this class of networks in a single pass are very limited. This is due to the limited number of states that the network can present. The only way to enhance the network capability is to break this constraint. One alternative is to route the multicast connection in a series of passes across the same network. For example, let the inlet address s=5 and D=2, 3, 7. It is impossible to route the connection in a single pass. However it could be accomplished by a series of passes. For example inlet 5 to outlets 2 and 3, and then inlet 5 to outlet 7. This property will be fully exploited in the later sections.

1.3 Passable multicast connections

From the previous discussion, it is evident that the multicast routing tag scheme only allows an inlet to send a cell to a power of two number of outlets. Further, if there are $2^j (0 \leq j \leq n)$ outlets for a single-pass multicast, given this scheme for computing and interpreting the tags, there must exist n–j bit positions in which all those outlet addresses agree and consequently there is a fixed set of j bit positions in which any two outlet addresses may disagree. For example, the outlet addresses D=2,3,6 and 7 expressed in binary form D=010,011,110,111 meets this criterion because there are $2^2$ addresses and they differ in two bit positions, the 0th and 2nd. This observation leads to the definition of an important concept: cube.

Definition 1:

A cube (implicant in logic minimization terminology) is a set of outlet addresses (integers) which can be reached through the network in a single pass using the routing tag scheme previously described.

From the above discussion, a cube (C) must satisfy the following two conditions: (a) $|C|=2^j (0 \leq j \leq n)$ and (b) (n–j) fixed set of bit positions in which all the elements of C agree.

In order to generate all the possible cubes for a multicast connection, let us refer to cubes which have the cardinality $2^j$ as "j-cubes". Obviously all the elements of D are 0-cubes. While any boolean logic minimization techniques may be employed, the following description utilizes a scheme similar to the Quine-McCluskey method for logical minimization to generate all possible cubes (as described in S. Muroga, *Logic Design and Switching Theory*, John Wiley and Sons, Inc., 1979). In this scheme, all of the pairs of 0-cubes are first combined, if possible, to form 1-cubes. For example, 1001 and 1011 form a 1-cube. In cube notation, this 1-cube can be represented as the replacement of 1001 and 1011 by 10x1, where the x symbolizes a 'don't care' binary position (i.e., it can be 0 or 1). Then these 1-cubes are used to generate all possible 2-cubes. This process continues until all r-cubes are generated for some $r(0 \leq r \leq n)$ such that there are no (r+1)-cubes. The entire set of cubes are known as the "complex C" of the set D, while the original outlet addresses (0-cubes) are the "base" of D.

Partition of complex C

Once we have the complex C, our objective is to select the minimal subset of C that constitutes a partition of the base D (0-cubes). A brute-force solution to obtain the minimal partition of D would be to delete cubes one by one from C in all possible ways so that the minimal partition of D can be found among all the partitions. Usually, however, this approach is excessively time-consuming because D may contain as many as $2^{n-1}$ cubes.

It can be easily shown that this problem is closely related to the well-known Set-Partitioning Problem (SPP), being essentially an SPP with equal cost constraint. (See the article written by E. Balas and M. Paberg, "Set partitioning: A survey," *SIAM Review*, Vol. 4, October 1976, pp. 710–761.) When the number of cubes is too large, derivation of a minimal partition is impossible to obtain in polynomial time since this is known to belong to the class of NP-complete problems.

To solve the above problem, we developed a "greedy" method which attempts the largest possible cubes in descending order of their size. The procedure to implement this method is illustrated in Procedure 1 where the input C is sorted in size.

```
Procedure 1: Greedy partitioning algorithm
Input: C = {C₁,C₂,...,Cᵣ},|Cᵢ| ≥ |Cᵢ₊₁|,D
Output: P = {P₁,P₂,...,Pₘ} begin
    P = C₁
    K = |C₁|
    for (i = 2,3,...,r) do
        if (K = |D|) then exit
        else
            if (Cᵢ ∩ P = 0) then
                P = P ∪ Cᵢ
                K = K + |Cᵢ|
            endif
        endif
    endfor
end
```

A Greedy Partitioning Algorithm can also be summarized as follows: Given: The complex C of the set D is sorted in size.

Step 1:

Choosing and removing the largest cube from complex C;

Step 2:

Choosing and removing the next largest cube from the remaining complex such that it does not contain any of the outputs previously identified;

Step 3:

Repeating step 2 until all the desired outputs in D have been identified and wherein the cubes selected in step 1 and 2 form the set P={$C_1, C_2 ..., C_m$} which is the partition D.

Figure 4:
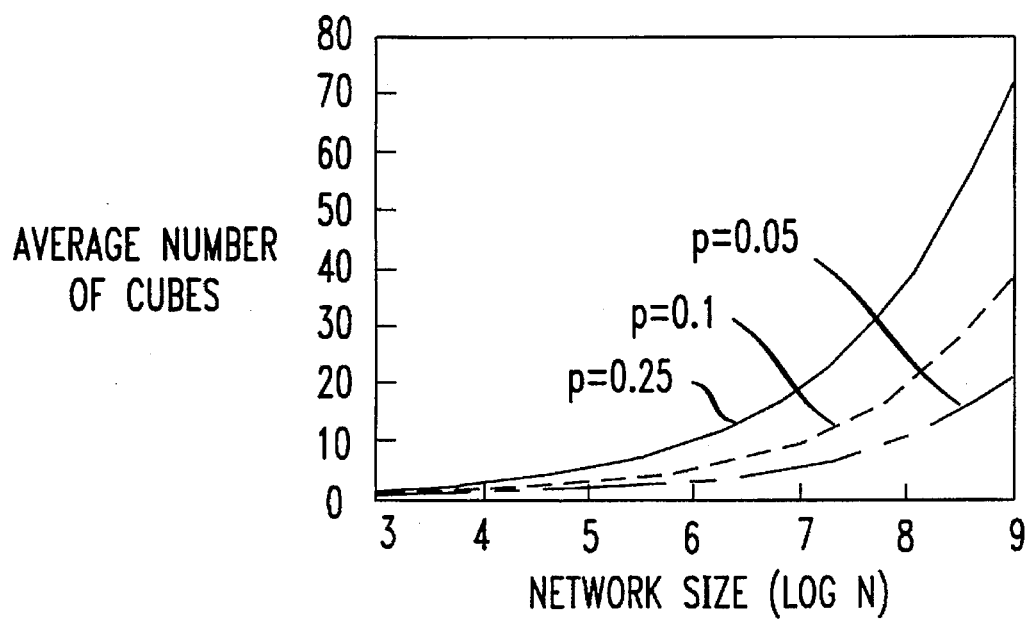
FIG. 4 shows a graph of how the average number of cubes vary with the probability parameter (p) and network size (stages)

Shown in FIG. 4 is the average of cubes for a given network size (LogN) and probability p (from Equation 1). To capture the average performance requires the generation of a large number of multicast instances and then by using Procedure 1, we obtain the average performances by averaging over a set of randomly generated multicast connections. The statistics shown in FIG. 4 are based on the distribution of the multicast connection size given by Equation 1 for the probability values of p=0.05, 0.10, 0.25. For example, when the network size n is 9 and p is 0.25, the average number of cubes generated by Procedure 1 is roughly 72.

It is worth pointing out that for a given cube it is straightforward to compute its multicast routing tag. For illustration, if C=1xx0, the corresponding routing tag M is 0110, and R can be any one of the outlet addresses belonging to the cube C. For the above example, R could be 1000, 1010, 1100, or 1110.

2. Routing Algorithms

The sequence of passes through the network required to route a multicast connection can be modeled as a "multicast tree". A routing algorithm generates a multicast tree by properly choosing the outlets to be reached at each pass. The choice of the multicast tree is strongly dependent upon the multicast capability constraints imposed by banyan networks and by the traffic pattern present at the connection set-up time. The major objective is to design a routing algorithm which minimizes the number of network passes through the network to minimize the total number of cells circulating in the network while employing the minimal amount of network resources. Two performance measures, the average number of passes through the network and the average number of internal links used per outlet, are used to compare the proposed routing algorithms. The former serves as an indication of average delay each cell experiences through the network. The latter is a measure of the amount of network resources that an algorithm utilizes. The present invention describes three routing schemes: I, II and III. Except for the routing scheme III, we assume that any outlet receiving a cell must be either a desired outlet or a branching node which will recycle the received cell, or both.

2.1 Cube routing algorithm—routing scheme I

This method accomplishes an arbitrary multicast connection by decomposing the original multicast connection into one or more intermediate multicast connections (cubes), each of which can be routed in one pass. In the previous section, we have already given the procedure to generate the partition P of D. Once this is determined, our next task is to build a multicast tree based on the cubes belonging to P. Before giving an algorithm for this purpose, we first introduce the "distance" concept and a method which maintains non-blocking property of a multicast tree.

It is known that there exists a necessary and sufficient condition for any two unicast connections to be routed through the baseline network without conflicts. (See, for example, the article by F. Bernabei et at., "On non-blocking properties of parallel delta networks," *Proc. IEEE INFOCOM '88*, 1988, pp. 326–333.) As will be described below, the results can be extended to banyan networks and in particular to the case of multicast connections.

Definition 2:

The distance between two inlets $s_1, s_2$ at the input of a banyan network is defined as $$d_{in}(s_1, s_2) = \min z \lfloor s_1/2^z \rfloor \bmod 2 \neq \lfloor s_2/2^z \rfloor \bmod 2, z = 0, 1, \ldots, n-1 \quad (2)$$

In binary representation of inlets, the distance defined above is equal to the least significant bit position in which the two inlets differ. For example, assume that $s_1 = 1010$ and $s_2 = 1100$, and we have $d_{in} = 1$ since bit position 1 (the second far-right bit position) is the least significant bit position in which $s_1$ and $s_2$ disagree. Note that $d_{in}$ is an integer in the range of $[0, n-1]$.

Definition 3:

The distance between two cubes $C_1, C_2$ at the output of a banyan network is defined as $$d_{out}(C_1, C_2) = \min\{\max_{u \in C_1, v \in C_2} z \lfloor u/2^z \rfloor \bmod 2 \neq \lfloor v/2^z \rfloor \bmod 2, z = 0, 1, \ldots, n-1\}, \quad (3)$$

In binary representations of cube, the distance defined above is equal to the most significant bit position in which the two cubes differ. Given $C_1 = xx01$ and $C_2 = x110$, for example, we have $d_{out} = 1$ since the most significant bit position where the two cubes differ is the first bit position. Note that the two cubes do not differ in the second bit position and that we need only to look at those positions where there is no x. The binary representation eases the computing of the distance $d_{out}$ or $d_{in}$.

The following equation establishes the necessary and sufficient condition that two inlets are routed to two cubes through a banyan network without blocking.

Let two selected inlets of a banyan network be at distance $d_{in}$ and connected to two disjoint cubes at distance $d_{out}$. The two multicast connections can be routed without conflict if and only if $$d_{out} - d_{in} \geq 0 \quad (4)$$

An example is illustrated in FIG. 2 where for $s_1 = 4$, $D_1 = 0, 1, 8$ and 9 and $s_2 = 8$ and $D_2 = 5$ and 7, we get $s_1 = 0110$, $s_2 = 1001$, $C_1 = x00x$, $C_2 = 01x1$, and we obtain $d_{in} = 2$ and $d_{out} = 2$. Since Equation 4 is satisfied, the two multicasts can be routed through the network without internal blocking.

It is evident from Equation 4 that any pair of inlets at distance of 0 can route any two disjoint cubes respectively without causing conflicts in the banyan network. It also holds that any two disjoint cubes at distance (n−1) can be addressed by any two inlets without conflicts.

Procedure 2 gives an iterative algorithm which generates the multicast tree.

Procedure 2:
    Cube routing algorithm
    Input: $P = \{P_1, P_2, \ldots, P_m\}$, $|P_i| \geq |P_{i+1}|$
    Output: a multicast tree, each node corresponding to a cube in P
    Define: L as the number of passes through the network

```
begin
    INPUT = P_1
    P = P − P_1, L = 1
    while (P ≠ 0) do
        OUTPUT = 0
        for (each inlet in INPUT) do
            scan P until a largest cube P_i
            has been found which has no conflicts
            with other selected inlet cube combinations
            P = P − P_i
            OUTPUT = OUTPUT ∪ P_i
        endfor
        INPUT = OUTPUT
        L = L + 1
    endwhile
end
```

For each inlet in INPUT, this algorithm scans P for a largest cube which has no conflicts with other already selected cubes in OUTPUT. When one is found, the corresponding cube is removed from P and put into OUTPUT. When all the inlets in INPUT have been selected, the next iteration is performed by using OUTPUT as INPUT according to the recycling mechanism. This iterative process continues until all the cubes in P have been removed. Our results have indicated that performance is insensitive to the way that each inlet in INPUT is selected.

Figure 5:
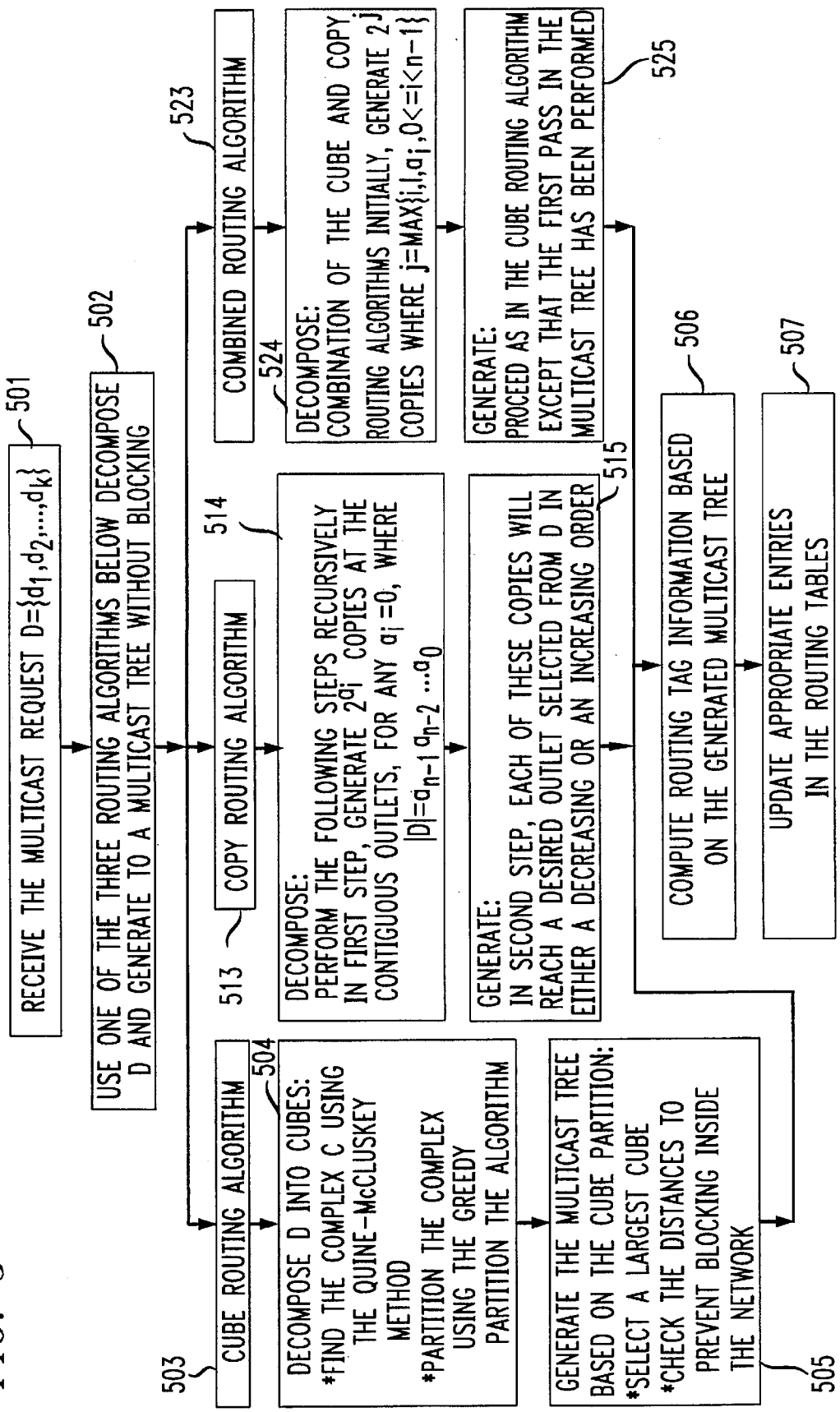
FIG. 5 shows a flow chart of the cube, copy and combined routing algorithms used by the present invention.

Shown in FIG. 5 is an illustrative flow chart describing the processing of a received multicast request which defines the multicast outlets $D = d_1, d_2, \ldots, d_k$. Note, the multicast request can be derived from signaling messages received at a source inlet port or directly received by the controller. In step 501, the multicast request is received by the controller of the self-routing multistage network (e.g., a banyan network). In steps 502 and 503, the controller selects the cube routing algorithm. In step 504, the controller finds the complex $C = \{C_1, C_2, \ldots C_r\}$ using the Quine-McCluskey method and then partitions the complex C using the greedy partitioning algorithm—Procedure 1. In step 505, the controller generates the multicast tree using the cube routing algorithm of Procedure 2 and checks the distances between cubes to prevent blocking inside the network. In step 506, the controller computes the routing tag {R, M} information to implement the multicast tree. In step 507, the controller sends the routing tag information to routing tables for each concentrator and expander (I/O controllers) identified in the multicast tree.

Figure 6:
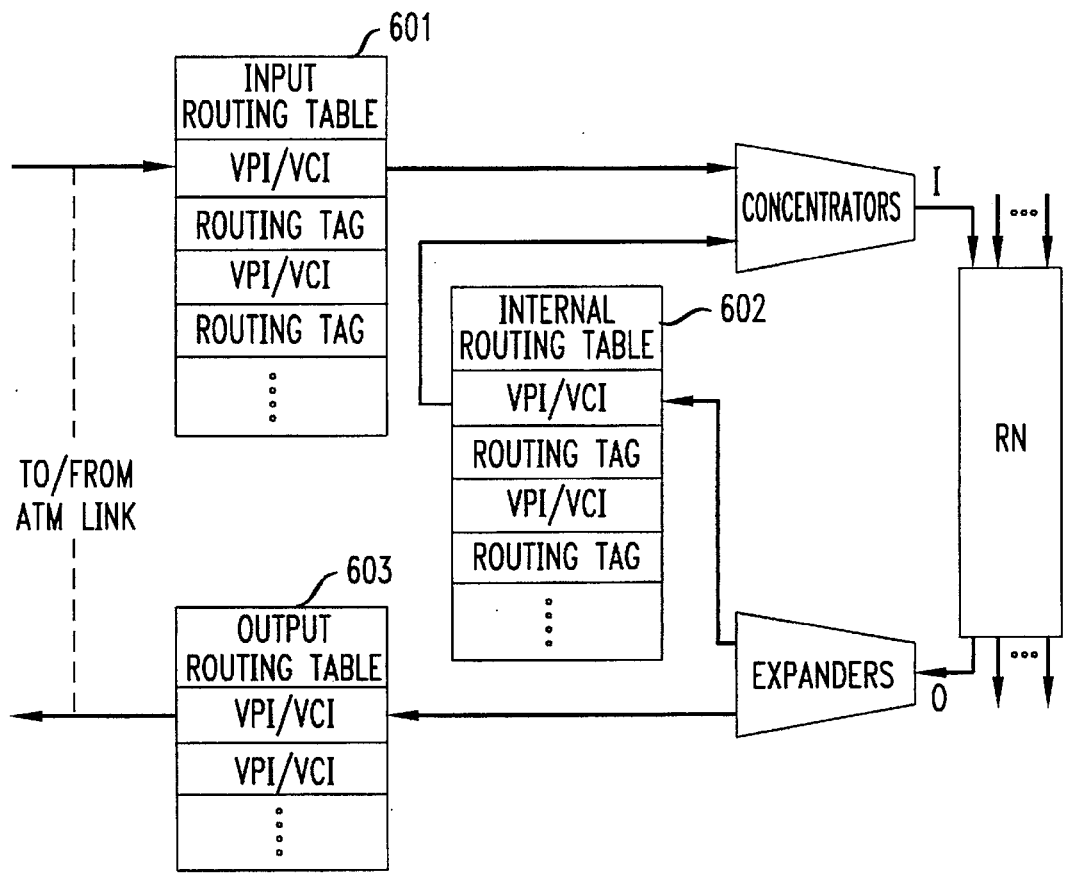
FIG. 6 shows the input, output and internal routing tables associated with each inlet (I)/outlet(O) pair of the routing network RN.

FIG. 6 illustrates a particular implementation of a self-routing multistage network which includes the input, internal and output routing tables (601–603) used in the concentrator and expander units. The input and internal routing tables 601 and 602 can be part of the concentrator unit of FIG. 1 while the output routing table 603 can be part of the expander unit of FIG. 1. Of course, it should be understood that the three-routing tables 601–603 can be implemented using one physical table means. These routing tables 601–603 can be part of a memory unit of the controller of FIG. 1.

Separate input, internal and output routing tables are required when it is desired to have the incoming VPI/VCI, internal VPI/VCI, and outgoing VPI/VCI information be selected independently of each other. The well-known VPI/VCI information is the call path and call cell identification in the cell header which is translated at each switch (self-routing multistage network RN) along the call path.

If internal VPI/VCI information in the routing network RN can be selected to be different from the input VPI/VCI information to the routing network RN, then the internal routing table can be eliminated and only input and output routing tables (601 and 603) are needed. Similarly, if the VPI/VCI information for the multicast connection is the same, then the output routing table can be eliminated and hence only the input routing table 601 is needed (e.g., a unicast connection).

Figure 7:
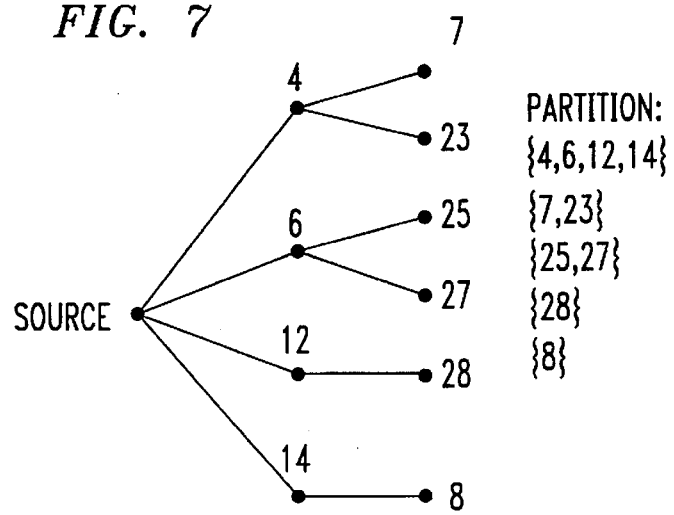
FIG. 7 shows a first example of a multicast tree generated for a particular multicast request using the cube routing algorithm.
Figure 8:
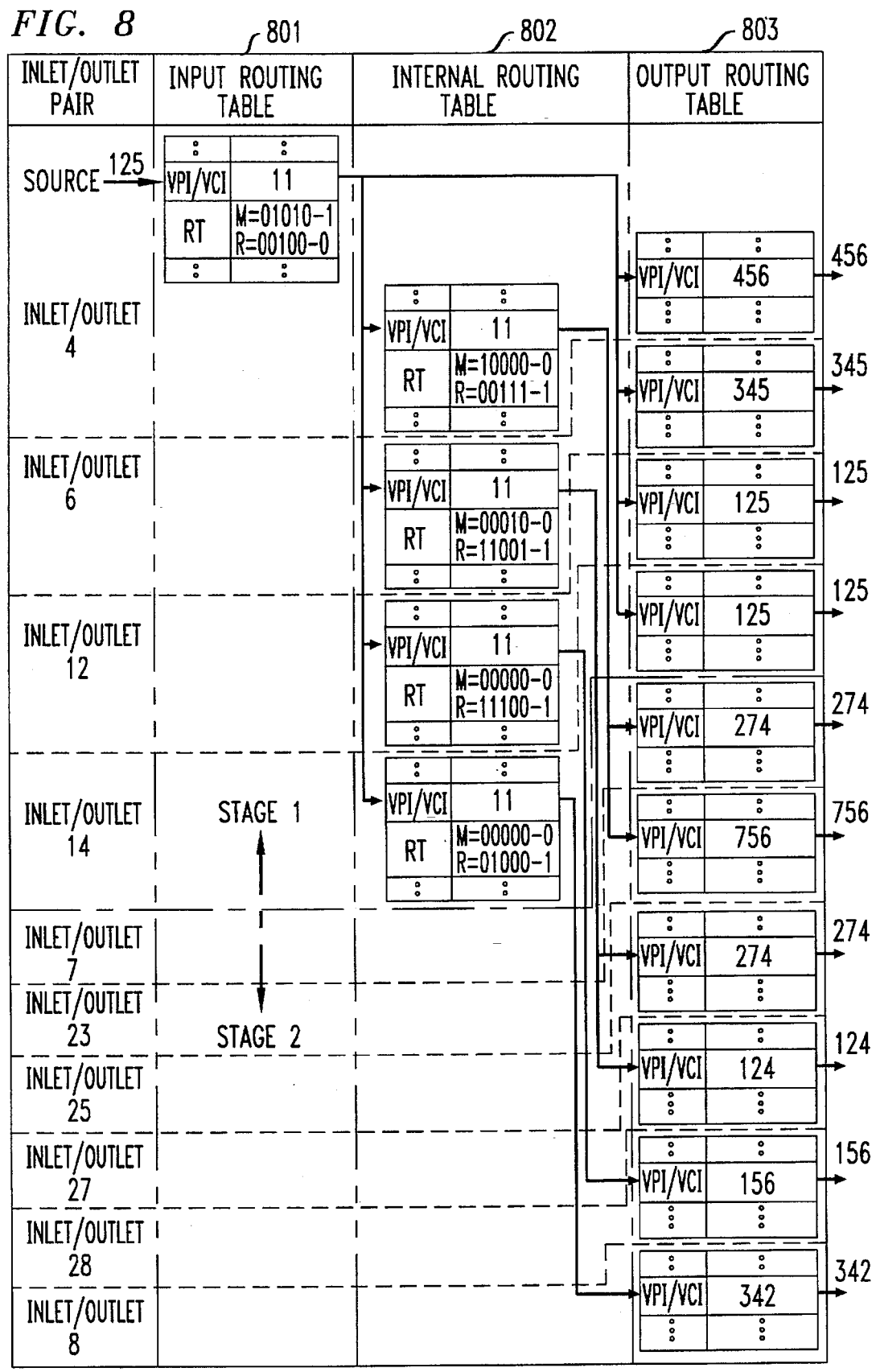
FIG. 8 shows illustrative routing table entries for the multicast tree generated in FIG. 7.

With joint reference to FIGS. 7 and 8, we illustrate the routing information which is sent to the routing tables to process the multicast request D={4, 6, 7, 8, 12, 14, 23, 25, 27, 28}. This information includes the VPI/VCI information as well as the routing tag bits M and R.

Note that in the multicast tree of FIG. 7 the multicast outlets of the first stage are selected as inlets for the second stage (i.e., network outlets 4, 6, 12 and 14 from the first pass through the network become inlets for the second pass through the network.) Note, also that the internal VPI/VCI number 11 is the unique multicast connection identifier from the routing network (RN).

The input routing table 801 shows M=01010-1 and R=00100-0 producing the cube 0x1x0 which in binary notation identifies the inlet/outlets 4, 6, 12 and 14. Since the M value is followed by a "−1", it indicates that the inlet/outlets 4, 6, 12 and 14 are both outlets and serve as inlets (or recycle inlets) for the second stage of the tree (second pass through the routing network RN). When the M value is followed by "−1", we ignore the "−0" bit in the R value.

The internal routing tables 802 select outlets 7 and 23 for the second stage inlet 4; select outlets 25 and 27 for the second stage inlet 6; select outlet 28 for second stage inlet 12; and select outlet 8 for second stage inlet 14. Note, the "−0" value following the M values indicates that these are only outlets, i.e., there is no recycling back to an inlet. The "−1" value following the R value also indicates an output-only function to the identified outlets.

The output routing tables 803 convert the internal VPI/VCI number 11 to the VPI/VCI number identified by the destination routing network RN (or switch) to which the outlet is connected.

Figure 9:
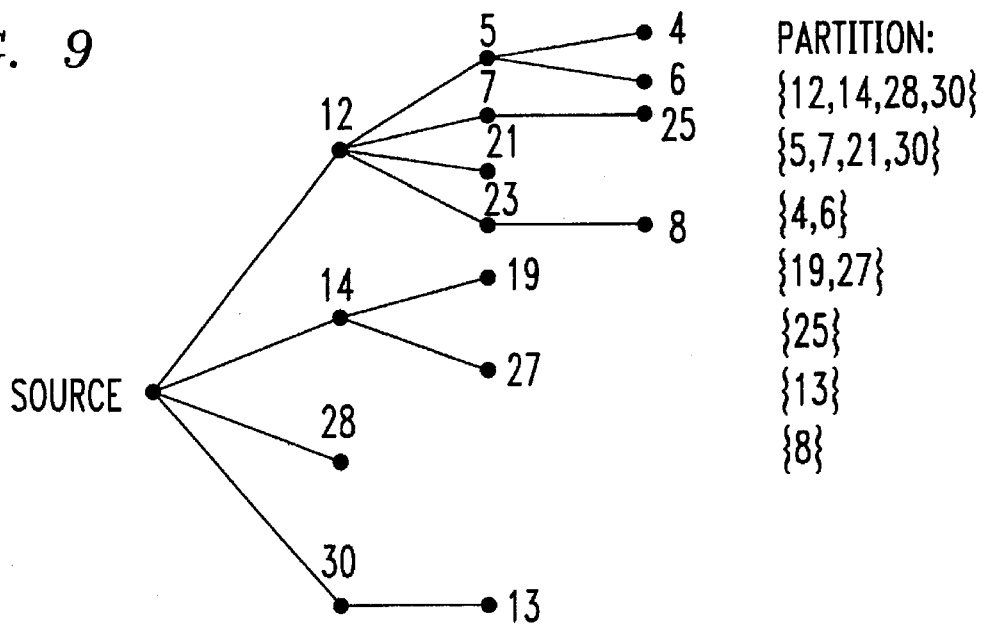
FIG. 9 shows a second example of a three-stage multicast tree generated by the cube routing algorithm for a different multicast request.

FIG. 9 shows a three-stage multicast tree generated by the cube routing algorithm for the multicast request D={4, 5, 6, 7, 8, 12, 13, 14, 19, 21, 23, 25, 27, 28, 30} and the cube partitions for each. Note that the cube partition for FIG. 7 utilizes only two stages (or passes through the network) while that of FIG. 8 utilizes three stages. The more stages required, the longer the delay time required to pass a data cell through the routing network.

Figure 10:
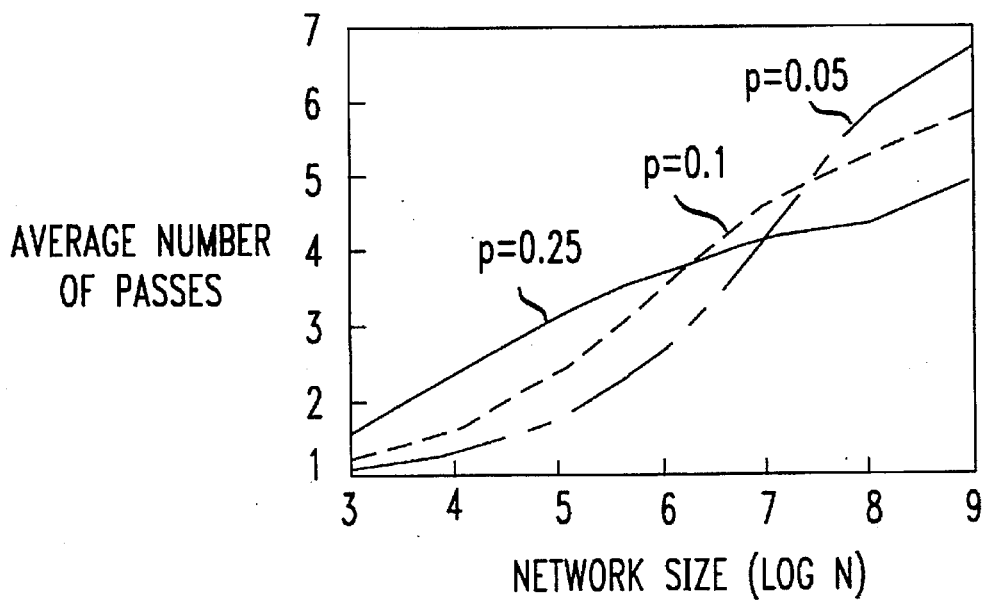
FIG. 10 is a graph showing how the average number of passes varies with parameter p and network size for the cube routing algorithm.

FIG. 10 plots the average number of passes obtained for different values of probability parameter p=0.05, 0.1, 0.25 against the network size. The effectiveness of this routing scheme becomes clear when we compare the results of FIG. 4 and FIG. 10. In FIG. 4, we have seen that when the network size is LogN=9 and p=0.25, the average number of cubes is roughly 72. In contrast, it can be found from FIG. 10 that the average number of passes required to transmit 72 cubes is only about 5. This exponential nature of deduction in the number of required passes results from the recycling scheme. For small network size, the average number of passes is proportional to p. However, as the network size grows larger, the reverse takes place. This suggests that this scheme is more effective when the product of the parameter p and the network size n (LogN) is sufficiently large.

Figure 11:
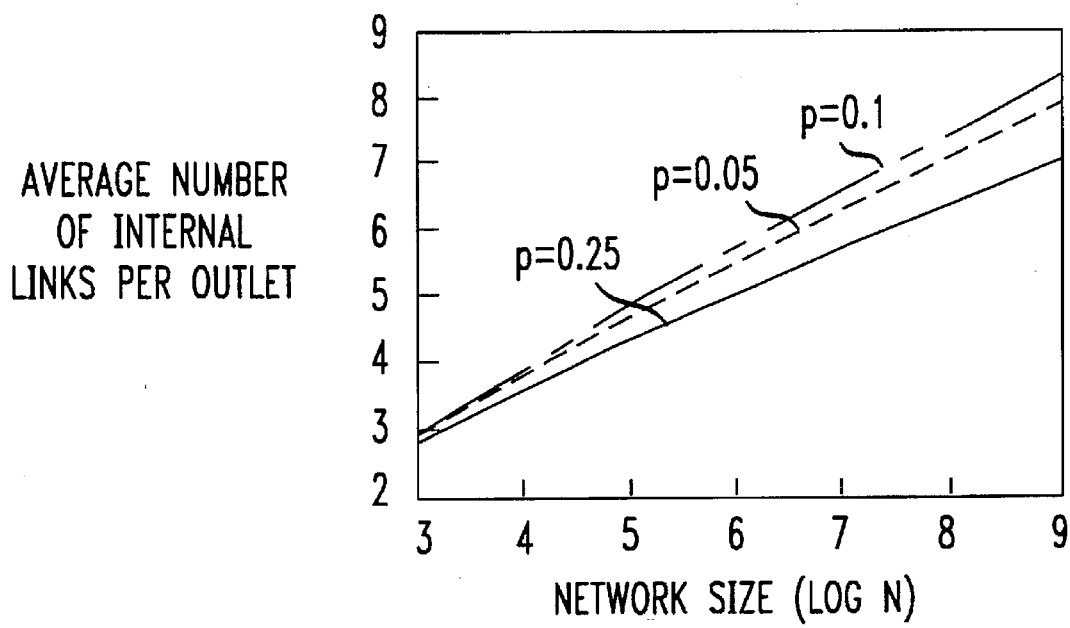
FIG. 11 is a graph showing how the number of internal links per outlet varies with parameter p and network size for the cube routing algorithm.

FIG. 11 examines the average number of internal links per outlet for the settings used in FIG. 10, where in general the usage of internal links steadily increases with the size of network. In contradiction to intuition, the larger p (i.e., the size of a multicast connection) is, the less internal links a multicast connection will use. This once again demonstrates that this scheme is cost-effective for the dense multicast connections in terms of the size of |D|. Comparing p=0.05 and p=0.25 when n=9, the savings on the internal links are roughly 15% for p=0.25. The effectiveness becomes more evident as the network size grows.

Figure 12:
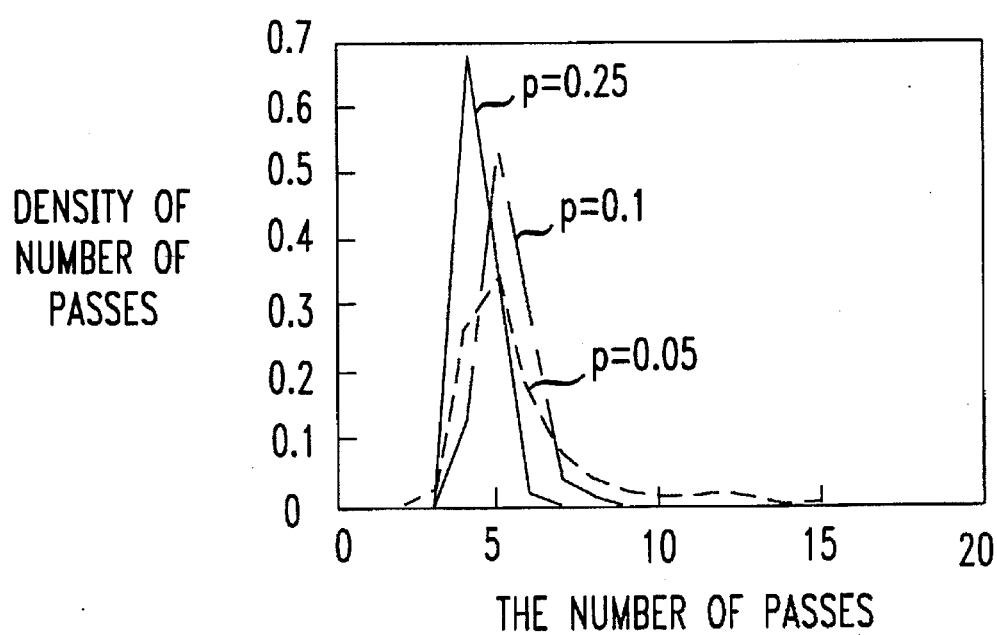
FIG. 12 is a graph showing the density of the number of passes for the cube routing algorithm.

Since the results shown above are concerned with the average performance, it is interesting to know how the performance measures are distributed around the average. FIG. 12 gives a set of curves about the distributions of the number of passes for the network size n=8 and p=0.005, 0.1, 0.25, respectively. We observe that the densities are evenly distributed around their averages. For instance, the probability that the number of passes is larger than 7 when p=0.25 is as low as 1%.

2.2 Copy routing algorithm—routing scheme II

For a given multicast connection D, the binary presentation of integer |D|=k can be written as $$k = \sum_{i=0}^{n-1} a_i 2^i$$

where the corresponding $a_i$'s ($0 \leq i \leq n-1$) can be evaluated recursively by using the equation $$a_i = \frac{k - a_0 - a_1 2 \ldots - a_{i-1} 2^{i-1}}{2^i} \mod 2$$

With reference to FIG. 5, in this scheme, routing is performed in steps 513–515. In the first step, 513, the copy routing algorithm is selected. Steps 514 and 515 are performed recursively. In step 514, the copy process takes place. In particular, for any $a_i \neq 0$, this process generates $2^{a_i}$ copies ($a_i$-cube) which appear contiguously at the output of the banyan network. This is to stimulate the function of a copy network. In step 515, those $2^{a_i}$ copies are recycled back to the network inlet and each copy is addressed, as a unicast connection, to an outlet of D in either a decreasing or an increasing order so that all these copies will not cause conflicts within the banyan network. These steps are accomplished by the same banyan network, achieving a full pipelining of information flow. Thereafter, steps 506 and 507 are performed to compute and distribute routing tag information as previously described.

Given p and n, the average number of passes, m, can be evaluated as $$m = \sum_{k=2}^{2^n-1} \left\{ a_0 + 2 \sum_{i=1}^{n-1} a_i \right\} p_k + p_1 + p_2. \tag{5}$$

Figure 13:
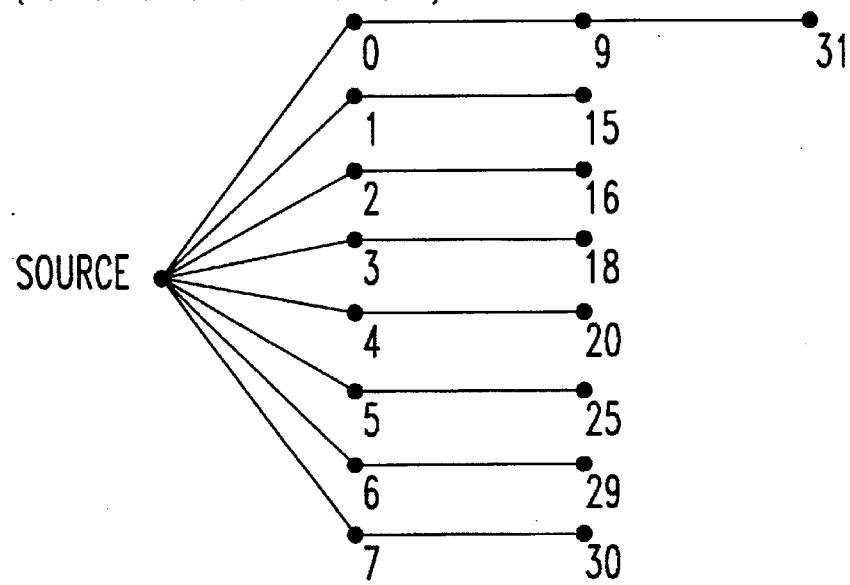
FIG. 13 shows an example of a multicast tree generated for a multicast request using the copy routing algorithm.

Shown in FIG. 13 is an illustrative multicast tree generated by the copy routing algorithm for the outlets D={9, 15, 16, 18, 20, 25, 29, 30, 31}.

The corresponding average number of internal links per outlet is given by $$l = \sum_{k=2}^{2^n-1} \frac{1}{k} \left\{ a_0 n + \sum_{i=1}^{n-1} a_i[(n-1-i) + 2^{i+1} + n2^i]p_k \right\} + \quad (6)$$

$$np_1 + \frac{2(2^n-1)}{2^n} p_2.$$

Figure 14:
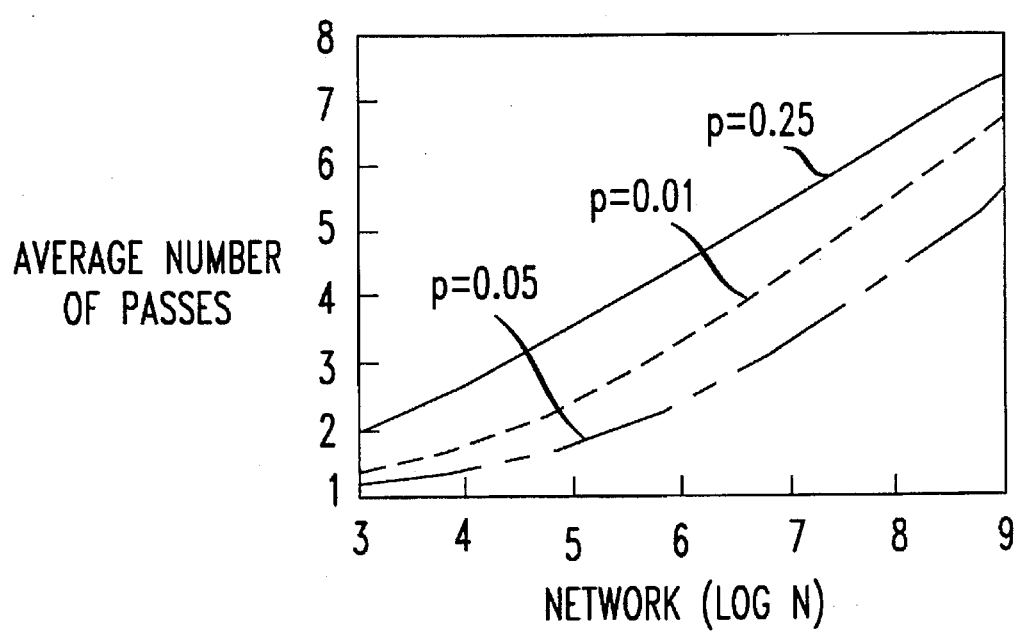
FIG. 14 is a graph showing the average number of passes for the copy routing algorithm.
Figure 15:
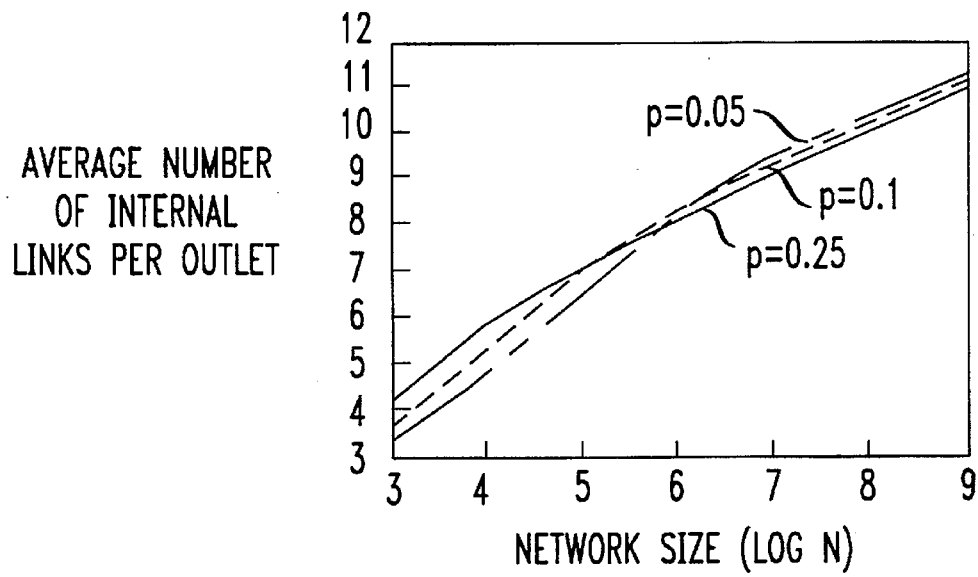
FIG. 15 is a graph showing the average number of internal links per outlet for the copy routing algorithm.

The numerical results computed from Equation 5 and Equation 6 above are illustrated in FIG. 14 and FIG. 15, respectively. FIG. 14 shows steady performance of this scheme for various values of p compared with FIG. 10. This is due to the fact that this scheme does not take advantage of cube property since it merely makes copies in the first step and sequentially transmits those copies in a unicast fashion during the second step. As illustrated in FIG. 15, the differences between average number of internal links per outlet for various p are marginal. It is also noticed that for the large product of p and n the performance is slightly improved.

The major advantage of this scheme is that it avoids the computation of the complex C and the partition of P.

2.3 Combined routing algorithm—routing scheme III

Figure 16:
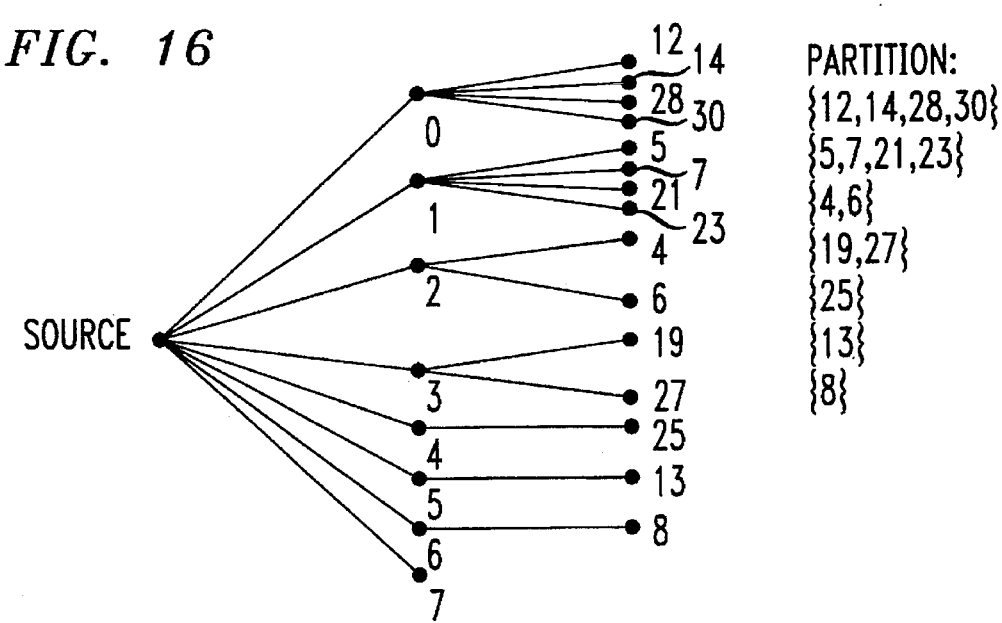
FIG. 16 is an example of a multicast tree generated for a multicast request using the combined routing algorithm.

Shown in FIG. 16 is a multicast tree generated by the combined routing algorithm (i.e., the copy routing algorithm for stage 1 and the cube routing algorithm for other stages). This algorithm is the combination of the previous two schemes in an attempt to keep the balance between the number of passes and the number of internal links per outlet. This scheme is motivated by the observation from FIG. 10 that when the network size is large, the average number of passes is in inverse proportion to the value of p. This attributes to the exponential nature of multicast tree. To further enhance the performance for small p, it seems necessary to generate more copies at the initial stage of building up the multicast tree. On the other hand, the routing scheme II produces a rather different performance where the average number of passes is in direct proportion to the value of p.

The combined routing scheme is basically the same as the scheme I, except the first pass is generated according to j cube where $$j = \max\{i | a_i \neq 0, 0 \leq i \leq n-1\}$$

Figure 17:
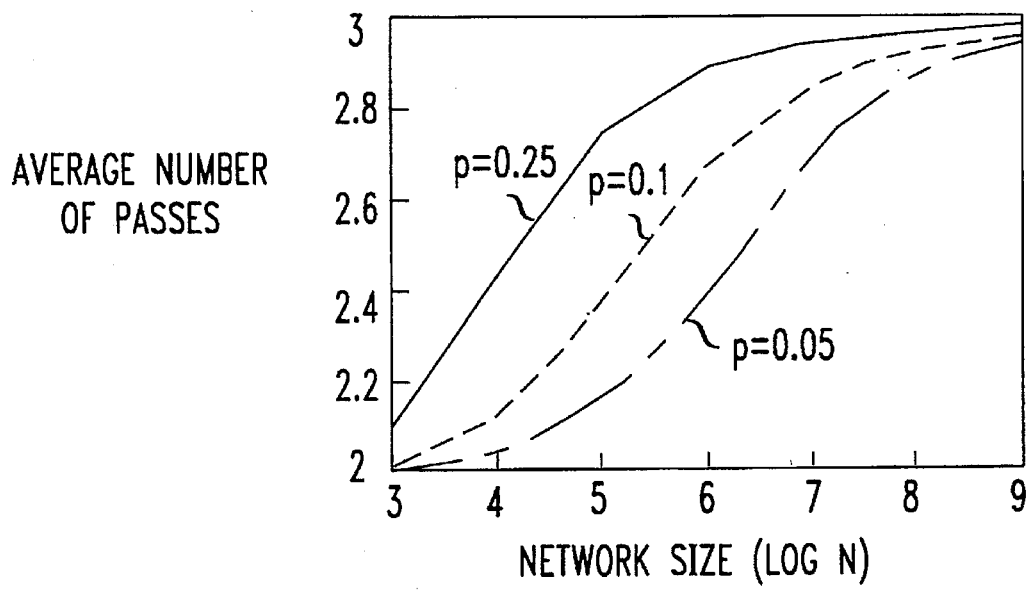
FIG. 17 is a graph showing the average number of passes for the combined routing algorithm.
Figure 19:
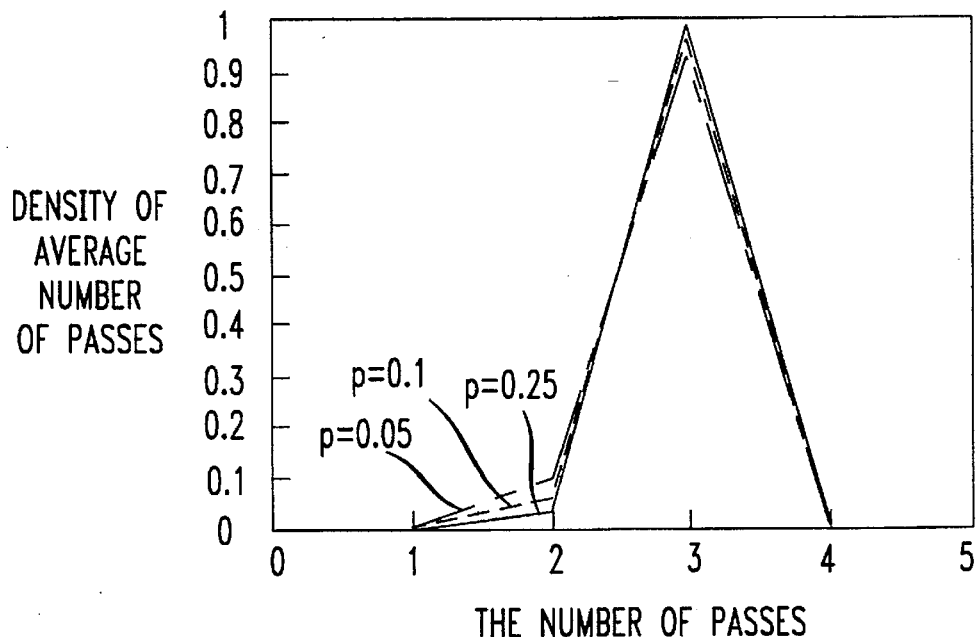
FIG. 19 is a graph showing the density of the number of passes for the combined routing algorithm.

The idea is to generate as many copies as necessary at the initial stage in the build-up process of multicast tree. This in turn will benefit from the exponential property of the tree generated on the basis of cubes. In the subsequent stages, the scheme proceeds exactly as the scheme I. As a result of generating the large number of copies in the first stage, the average number of passes has been significantly reduced as shown in FIG. 17. As expected, the performance lies in somewhere between the scheme I and scheme II. In fact, it is shown that the average number of passes appears to be bounded by the value of 3 regardless of the choice of p. This indicates the robust nature of this algorithm in the sense that it performs equally well for various p provided that the network size is sufficiently large. Once again, FIG. 19 looks at the distribution of number of passes for the ease of n=8, where the robustness of this scheme is demonstrated since the performances are comparable for different values of p.

Figure 18:
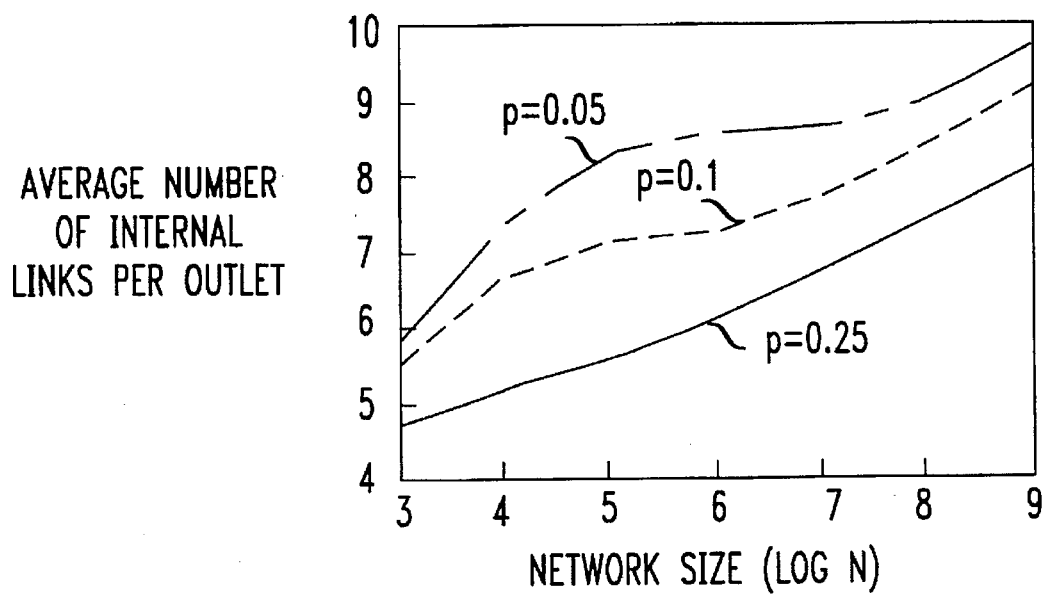
FIG. 18 is a graph showing the average number of internal links per outlet for the combined routing algorithm.

FIG. 18 plots the average number of internal links per outlet for different values of p. The comparison between FIG. 11 and FIG. 18 reveals that the reduction in terms of the average number of passes for the combined routing scheme is achieved at the cost of slight increase of average number of internal links. Like the scheme I, the performance shown in FIG. 18 strongly favors the choice of large p. This shows that using this scheme the better utilization of network resources (internal links) will be achieved for large size of multicast connections (large p).

In the following sections, two new algorithms are disclosed for improved multicast routing, namely, a cube routing and two-phase routing algorithm. As a prelude to introducing these algorithms, and to better explain their advantages, some new results are presented on non-blocking properties of Banyan networks.

3. Non-Blocking Routing in Banyan Networks

The Banyan network (designed with 2×2 switching elements) is a classic multi-stage network which uses the perfect shuffle interconnection between switching stages. the log N-stage Banyan network is also referred to as the Omega network. In a Banyan network, every input terminal has a unique path to every output terminal. Further, the network exhibits self-routing capability, i.e., from any input an output destination can be reached by simply following the binary label of the output terminal. This routing algorithm simply uses i-th most significant bit in the i-th stage, and takes top output of switch if its i-th destination bit is 0 and bottom output otherwise. Thus, routing in this network can be achieved by including the destination address as header bits of a message and the switches are set on the fly in a distributed manner. Similar destination address controlled algorithm exists for all other log N-stage networks.

A characterization of the Banyan network, called "Balanced Matrices Characterization", by Linial and Tarsi is used in checking passability of connections that are specified as input/output pairs. Consider a connection pattern π, which maps inputs $x, 0 \leq x \leq N-1$ to $\pi(r)$. The functions $M(x,y)$ are defined to be the number of most significant bits which agree in the binary expansions of x, y and $L(x,y)$ to be the number of least significant bits which agree in the binary expansions of x,y. A permutation π is passable by the Banyan network if and only if for all pairs.

$$x \rightarrow \pi(x), y \rightarrow \pi(y)$$

in the connection pattern, $$L(x,y) + M(\pi(x), \pi(y)) < n$$

where n=logN.

For example, consider a connection set which has input 2 to be connected to output 5 and input 6 to be connected to output 7 for a Banyan network with N=8.

We find that

L(2,6)=L(010,110)=2

M(5,7)=M(101,111)=1

L(2,6)+M(5,7)=3=n.

Therefore, this connection pair has conflict in the Banyan network. This approach can be captured nicely by the use of "balanced matrices". Consider the following permutation π, for N=8, which is expressed using N×2n binary matrices shown below. This matrix, say A, is composed of 6 columns, namely $s_3, s_2, s_1, d_3, d_2, d_1$.

| Inputs | | | Outputs | | |
|---|---|---|---|---|---|
| $s_3$ | $s_2$ | $s_1$ | $d_3$ | $d_2$ | $d_1$ |
| 0 | 0 | 1 | 1 | 1 | 1 |
| 0 | 0 | 1 | 1 | 1 | 0 |
| 0 | 1 | 0 | 0 | 0 | 0 |
| 0 | 1 | 1 | 1 | 0 | 1 |
| 1 | 0 | 0 | 0 | 1 | 0 |

-continued

| Inputs | | | Outputs | | |
|---|---|---|---|---|---|
| $s_3$ | $s_2$ | $s_1$ | $d_3$ | $d_2$ | $d_1$ |
| 1 | 0 | 1 | 0 | 1 | 1 |
| 1 | 1 | 0 | 1 | 0 | 0 |
| 1 | 1 | 1 | 0 | 0 | 1 |

It can be verified that π is passable by the Banyan network as, for all pairs of inputs the sum of L and M functions values satisfy the constraint discussed above.

Consider forming N×n matrices with n columns of the above matrix, A. In our example N=8 and n=3. We call each of these 8×3 matrices as a window. If all rows in such N×n matrix (a window) are all distinct then we call that matrix as "balanced". For π to be realized by the Banyan network, the four windows formed with the columns $s_3s_2s_1$, $s_2s_1d_2$, $d_3d_2d_1$ must each be balanced In the window $s_1d_3d_2$ of the above example, if any 2 rows are identical in this 8×3 matrix, it means that those two input-output pairs will conflict as they both will require the same output link in the 2nd stage. In general, for a Banyan network with $N=2^n$, (n–1) middle windows need to be checked for conflicts to see if a given connection (permutation) is realizable or not. This checking can be done with an O(N log N) algorithm.

3.1 Non-Blocking Routing for Output Cubes

In this section we consider the problem of finding a mapping between m consecutive inputs and m arbitrary output cubes. A cube is an n-bit string where each bit can be either 0, or 1, or x (don't care), and thus a cube represents some power of 2 outlets. This mapping of inputs to output cubes should be such that there are conflicts in any windows, as defined in Section 2. When we are comparing bit patterns, an x in a position matches with both 0 and 1 in that position. Two cubes are said to match in (n-k) ms bits ($1 \leq k \leq n-1$) if given a cube, at least it matches another cube in the same group.

If each cube is treated as a node and a graph is constructed with edges between two nodes if they match, the resulting pattern for the matched group is a connected graph. If two cubes match in (n-k) ms bits, there exists an instance (0-cube) of one cube that matches the other cube (n-k) ms bits.

First the problem is considered of partitioning m cubes into two groups I and O such that if I is expanded and used as inputs, there exists a one to one mapping between these inputs and cubes in O without blocking. Let t ($0 \leq t \leq n-1$) be the most significant bit in m's binary representation that is not zero, and denote $J=2^t$. The following theorem is established.

Theorem 1: For an $N=2^n$ Banyan network, we are given a set of m cubes with no duplicate addresses. We can partition m cubes into two groups, I(|I|=J) and O and form an input set expanding the cubes in group I such that there exists a mapping of some of the input set to cubes O and that the resulting connection pattern is routable without blocking in the Banyan network.

Theorem 1 will be used in constructing the cube routing algorithm.

The problem is now considered of finding a mapping between m consecutive inputs and m arbitrary output cubes. A cube is an n-bit string where each bit can be either 0, or 1, or x (don't care), and thus a cube represents some power of 2 outputs. Consider the following example of routing from 5 consecutive inputs to 5 cubes:

Inputs: 00000, 00001, 00010, 00011, and 00100

Outputs: 01000, 11100, 0x1x0, 11x1, x0111

It is possible to map inputs to outputs so that these 5 inputs can route to the 5 cubes without blocking in the Banyan network. This mapping is:

| 00000 | 0x1x0 |
| 00001 | x0111 |
| 00010 | 01000 |
| 00011 | 110x1 |
| 00100 | 11100 |

A natural question to ask is whether we can always find such a mapping between m consecutive inputs and m arbitrary output cubes for routing without blocking. Clearly, if all the cubes are individual outlets (no x's appear in outputs); we can always find such a mapping. However, with general cubes it is not always possible to find a mapping for non-blocking routing in the Banyan network. The following example shows that an assignment is impossible.

Inputs: 00000, 00001, 00010, 00011, and 00100 Outputs: xxxx0, xxx01, xx011, x0111, 11111.

In this example, the first cube xxxx0 matches in the ms four bits with all other cubes. Therefore, if we assign this cube to an even input, say 00000, then we cannot assign any cube to other even inputs. Since there are only two odd values in our input set, we will assign this cube to 00001. Inputs 00000 and 00100 have 2 ls bits in common. Hence, if we assign the cube xxx01 to input 00000 then we will not be able to assign any other cube to input 00100. This is because cube xxx01 has 3 ms bits common with the other three cubes. So, we will assign this cube xxx01 to input 00010. At best we can map 4 of the 5 inputs to 4 cubes as shown below.

| 00001 | xxxx0 |
| 00010 | xxx01 |
| 00000 | xx011 |
| 00100 | x0111 |

In this example, all 5 output cubes match in the most significant 3 bit positions. In the input set of 5 consecutive values, there can be at most 4 distinct bit patterns in the least significant 2 bits. Thus, when we consider the window consisting of 2 ls bits of inputs and 3 ms bits of outputs cubes, any assignment with all 5 inputs to cubes will lead to conflicts in this window. This shows that, in general, we will not be able to map m consecutive inputs to m arbitrary output cube so that we can route without blocking in the Banyan network. However, such conflicting cubes composing an arbitrary multicast connection has very small probability. When there are no such conflicting cubes, it is possible to route without blocking from m inputs to m output cubes.

In the following we give a sufficient condition under which we can always map consecutive inputs to output cubes for non-blocking routing.

Theorem 2: For an $N=2^n$ Banyan network, we are given a set of m consecutive inputs and a set of m output cubes. The output cubes are such that, for $1 \leq k \lceil \log m \rceil$, there are at most $2^k$ output cubes that match in (n-k) most significant bit positions. Under this condition, there exists a mapping of inputs to output cubes such that the resulting connection pattern is routable without blocking in the Banyan network.

Proof: The proof is based on constructing successive partitioning of output cubes so that non-conflicting assignment can be achieved. First we will give an assignment based on the recursive partitioning of the output cubes, and then prove that this assignment is conflict-free.

Initially, given a list of output cubes, group (re-arrange) the cubes in the list that match in (n-⌈log m⌉) ms bit, called G(⌈log m⌉) groups. Notice that there could be more than one G(log m⌉) groups, and each group could just contain one cube. Within each G(⌈log m⌉) group, we further group the cubes that have (n-⌈log m⌉+1) ms bits. This partitioning procedure is successively repeated ⌈log m⌉ times to obtain all G(k) for $1 \leq k \leq \lceil \log m \rceil$ groups. Let the result be a cube list $C_1, C_2, \ldots, C_m$. Assume inputs from 1 to m. Now assign i to $C_i$ for $1 \leq i \leq m$.

Now we prove the above assignment is conflict-free. Consider any two input-output pairs, (i, $C_i$) and (j, $C_j$). First of all, we consider $C_i$ and $C_j$ are in the same groups. $C_i$ and $C_j$ may belong to more than one group. Without loss of generality, we consider $C_i$ and $C_j$ are in their highest possible group, say G(k). This implies that $C_i$ and $C_j$ do not match k 1s bits. According to the condition of Theorem 1, at most $2^k$ cubes can be in this group. Since all the cubes in the G(k) are assigned to the contiguous inputs, i and j do not match k 1s bits. Therefore, in any window consisting of some k 1s bits of inputs and (n-k) ms bits of output cubes, there can be no conflict. Secondly, we consider $C_i$ and $C_j$ do not belong to any group. In this case, in any window consisting of some (n-1) ms bits of output cubes, there can be no conflict. This completes the proof.

In the text section we will use these results to develop our two-phase multicast routing algorithm to route from a source to some D destinations.

4. Additional Multicast Routing Algorithms

The sequence of network acrossing required to route a multicast connection can be modeled as a multicast tree. A routing algorithm is to find the multicast tree by properly choosing the outputs to be reached at each network pass. The major objective to design a routing algorithm is to minimize the number of passes, which in turn reduces the total number of cells circulating in the network, while employing the minimal amount of network resources. Two performance measures, the average number of network passes and the average number of internal links used per output, are used to compare the presented routing algorithms. The former serves as an indication of average delay each cell experiences through the network. The latter is a measure of the amount of network resources that an algorithm utilizes. Furthermore, any undesired output, which is not part of D, is not allowed to be a leaf of the resulting multicast tree.

In the previous section, we have given the procedure to generate the partition P of D. Once this is determined the next task is to build a multicast tree based on the cubes belonging to P, namely, to decide the successive passes through the network, while retaining the non-blocking property.

4. 1 Cube Routing Scheme

According to the routing tag scheme, in the first pass, we must route to a cube since we do not allow any undesired outputs to be in leaf positions in the multicast tree. The cube routing algorithm works as follows. A given multicast destination set is decomposed into a set of m cubes. Then, according to the partitioning procedure of Theorem 1, m cubes are partitioned into two groups, I and O, where |I|=J. This scheme sends to a cube with d consecutive destinations I the first pass, and then uses these outputs as inputs to route to all the cubes I the second pass. There is a mapping of d inputs to J cubes that guarantees non-blocking if the cubes in I satisfies the condition of Theorem 2. In the third pass, an input set of some instances of cubes in I is formed According to Theorem 1, we can always find a mapping of some instances of cubes in I to cubes in O without blocking in the third pass. This algorithm requires at most three passes for routing an arbitrary multicast.

Cube Routing Algorithm

Given: A source s and a set D of destinations. The destinations are composed into a set of m cubes C1, C2, . . . Cm. Let J=2t where t is the non-zeroed most significant bit in m's binary form.

Phase 1: Send from the source to J consecutive outputs (a t-cube). Use these consecutive outputs as inputs in the next pass.

Phase 2: Partition m cubes into two groups I and O according to theorem 1. Assign inputs to cubes according to Theorem 2.

Phase 3: For each cube in O, find its corresponding matched cube in I. Use an instance of the matched cube as an input to route the cube.

This routing algorithm uses the same routing tag scheme in each pass through the network.

4. 2. Two Phase Multicast Routing

In order to complete the multicast in two passes, we need to generate an arbitrary number of consecutive outputs in the fist pass. We will use a slightly modified distributed control of switches so that any input can broadcast to m consecutive outputs. The modified switch control will still use 2n bits routing tag in n bit words R and M, and during routing phase these bits are used in exactly the same manner as described earlier. In addition, we will use a single bit to specify copying and routing phases. During a copying phase, these two n bit words indicate the minimum and maximum addresses (usually 0 and m−1) of outlets to which we want to copy from an input s. Source looks at first bit of R and if it is 0 it sends it to upper output only. If it is 1, it sends to both outputs and modifies the routing tag word R for the upper output. Specifically we change it to indicate the last output that branch must reach, which is 0 followed by all 1's. The tag for 1 branch remains the same.

In order to complete the multicast in two phases, we make sure that the cubes composing a given multicast connections satisfies the condition of Theorem 2. First, we obtain the cubes from the given set of D output destinations using the greedy heuristic algorithm. We then check to see if there are conflicting cubes, i,e., our condition in Theorem 2 is not satisfied. If necessary, we will regroup the output cubes into a different set of cubes representing the same multicast connection that satisfies our required condition. If needed, we will expand a few large cubes into smaller cubes (break one large cube into 2 by fixing a bit position that has x) so that the conflicts are eliminated. Since occurrence of such conflicting cubes is rare, verified by our simulation, this will not increase the number of output cubes significantly. The technique we then employ to accomplish an arbitrary multicast connection is to use a copying phase to broadcast to a group of contiguous outputs, and then use these in the routing phase to complete the multicast. We now present our multicast algorithm.

Two Phase Routing Algorithm

Given: A source S and a set of D destinations. The destinations are composed into a set of m cubes $C_1, C_2, \ldots, C_m$ such that at most $2^k$ cubes match in (n-k) most significant bits.

Phase 1: Copying phase; copy from source to m consecutive outputs. Use these consecutive outputs as inputs in the next pass.

Phase 2: By successive partitioning of inputs and outputs find a mapping of inputs to output cubes which has no conflicts in any window. Route from the m consecutive inputs to the output cubes with this mapping to complete the multicast routing.

4. 3 Implementation

Figure 1:
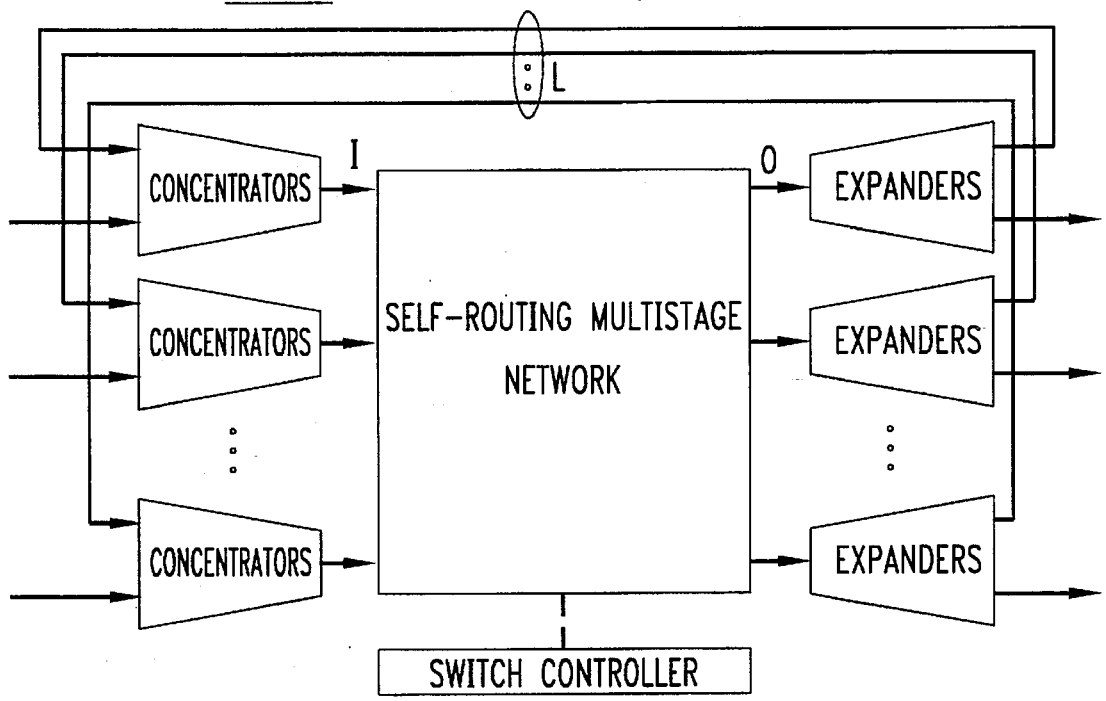
FIG. 1 illustrates a prior art self-routing multistage network (RN) in which the present invention may be implemented.

Referring to FIG. 6, a logic view of the recirculating scheme implementation is shown, where there are shown input, internal, and output routing tables 6061–603 used in the concentrator and expander units of FIG. 1. The input and internal routing tables 601,602 can be part of the concentrator unit, while the output routing table 603 can be part of the expander unit. Of course, it should be understood that the three routing tables can be implemented using one physical table means.

Separate input, internal and output routing tables are required when it is desired to have the incoming VPI/VCI, internal VPI/VCI and outgoing VPI/VCI information be selected independently of each other. If internal VPI/VCI information in the routing network can be selected to be different from the input VPI/VCI information, then the internal routing table can be eliminated and only input and output routing tables are needed. Similarly, if the output VPI/VCI information for the multicast connection is the same, then the output routing table can be eliminated and only the input routing table is needed (e.g., a unicast connection).

Figure 20:
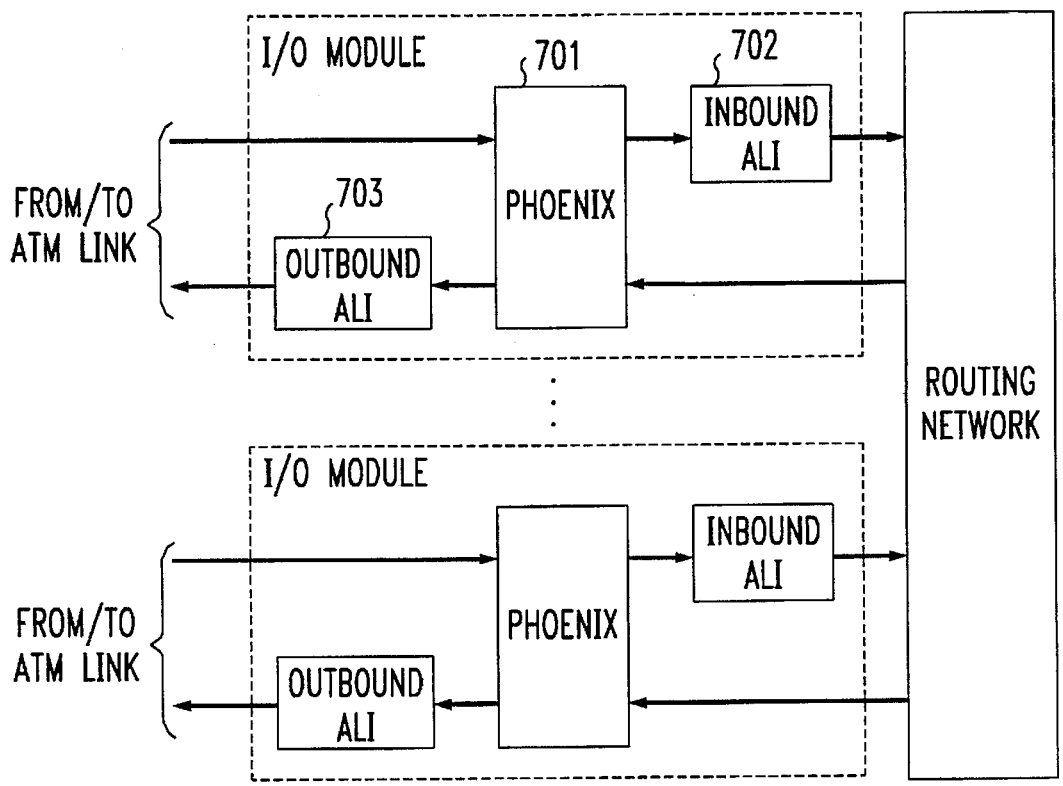
FIG. 20 shows one preferred implementation for a cell circulation scheme.

Implementation of one preferred embodiment of the present invention recirculating scheme is shown in FIG. 20. FIG. 20 shows one Phoenix chip 701 and two translator chips 702, 703 called ALI (ATM Layer Interface) for each input/output pair in order to circulate cells from output back to input. The Phoenix chip 701 is a two by two switching element which implements the routing tag scheme previously described The ALI chip 701, 702 is a translation chip which performs ATM cell header translation and inserts/extracts the routing tag to/from the cell. With reference to FIG. 6, the input and internal routing tables are implemented in the inbound ALI 702, while the output routing table is located I the outbound ALI 703. The Phoenix chip 701 performs the functions of both expander and concentrator. A cell needed to be recycled for multicast will be switched by the Phoenix chip 701 back to the inbound ALI 702 for further entry to the switching fabric. During the call setup, the routing tag information is calculated based on the destinations and stored in the routing tables in the ALIs. AN incoming cell finds its routing tag information by operation of table look-up.

5. Performance Evaluation

Our criteria for evaluating the performance of multicast routing algorithm is in terms of the number of passes required and the number of internal links utilized. At minimum we need one pass and an algorithm that routes an arbitrary multicast in a single pass requires individual switch control and can be expensive. By limiting multicast routing to only cubes in a pass we require just 2 control bits per stage of the network. With this simple control, arbitrary multicasts can at best be routed in two passes through the multistage network without blocking in each pass.

5.1. Internal Links Required by the Optimal One Pass Scheme

We would like to compare the number of internal links used by our algorithm to that used by the optimal one pass algorithm which requires individual switch control and the simple two pass multicast algorithm. Clearly, the number of internal links used by a multicast algorithm depends on the D destinations of a given multicast set. A multicast routing in one pass will be accomplished by selecting links of the multistage network that form a binary tree with source as the root and the D destinations as the leaves. Since the binary tree must have a depth of n, as we are using an n stage network, the number of links in the tree for a given D destinations depends on the pattern of destinations. We will use D to denote the number of destinations in a given multicast when there is no ambiguity. If all the fanning out happens towards the destination then the binary tree will have fewest links and if the fanning out is at the source side then the tree uses maximum number of links. Thus we can compute these bounds on the number of links for the one pass multicast algorithm. Assuming $D = 2^d$, for some d, the minimum number of links required is $$\sum_{i=1}^{i=d} 2^i + (n - d)$$

For sufficiently large values of D, this lower bound is approximately equal to 2D.

The maximum number of links used by the one pass multicast, with full binary tree from source, can be calculated as:

$$\sum_{i=1}^{i=d} 2^i + (n - d)*D$$

So, the upper bound on the number of links is about $(2*D+(n-d)*D)$. The maximum number of links required for a multicast can be $2*2^n = 2N$ when broadcasting to all destinations.

For an arbitrary set of D destinations, the number of internal links used by the optimal one pass algorithm can be calculated as follows. Let the number of distinct bit patterns in the most significant i bits of destination set be $a_i$. To multicast from any source to this D destinations we will need to have the data at $a_i$ internal links after routing through i stages. Therefore, the total number of links used will be $$\sum_{i=1}^{i=n} ai.$$

Figure 21:
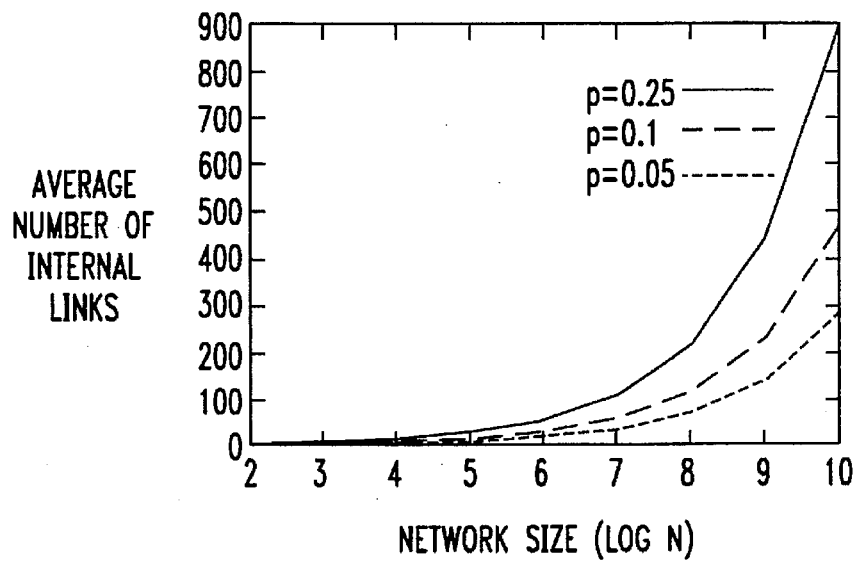
FIG. 21 is a graph showing the average number of links required for the optimal routing algorithm.

We ran extensive simulations to compute the average number of internal links used by the optimal one pass multicast algorithm. We simulated random multicasts with 5%, 10%, and 25% (parameter p) of destinations in a multicast for multistage networks with 2 to 10 stages and the results are shown in FIG. 21.

5.2. Internal Links Utilized by the Simple Two Pass Scheme

We can easily calculate the number of links used by the simple multicast routing algorithm which routes to D consecutive destinations first, and then route from these consecutive D destinations to all the outputs. For this simple algorithm (which does not use cubes), the number of links used in first pass is given by:

$$\sum_{i=0}^{i=n-1} \left\lceil \frac{D}{2^i} \right\rceil$$

where n is the number of stages in the network. In the second pass each input routes to a distinct output, and therefore, the number of links used in this pass is n*D. Thus, the total number of internal links utilized by this simple two pass algorithm is given by:

$$\sum_{i=0}^{i=n-1} \left\lceil \frac{D}{2^i} \right\rceil + n*D$$

In out two phase algorithm, we will be decomposing the set of D destinations into m cubes and we expect that m<<D for most multicast connections. Therefore, the number of internal links used by our two phase algorithm will be significantly less than that compared to the simple multicast algorithm.

5.3. Internal Links Utilized by the Cube Routing Algorithm

For our cube routing algorithm, the number of links used in the first phase to route to m consecutive outputs is:

$$\sum_{i=0}^{i=n-1} \left\lceil \frac{m}{2^i} \right\rceil$$

This number will be $2J-1+n-\lceil \log \rceil$. The number of links used in the second phase depends on the composition of the m cubes. Given a cube, we can calculate the number of internal links used from one source to destinations in that cube. Let the given cube be denoted by $C=c_{n-1}, c_{n-2}, \ldots, c_1, c_0$. Define a function f for $0 \leq i \leq n-1$ as follows:

$$f(c_i) = \begin{cases} 1 & c_i = x \\ 0 & c_i = 0 \text{ or } c_i = 1 \end{cases}$$

The number of internal links used in routing from a source to one cube C is then given by $$L(C) = 2^{f(c_{n-1})} + 2^{f(c_{n-1})+f(c_{n-2})} + \ldots + 2^{f(c_{n-1})+\ldots} + \ldots + f(c_0)$$

In the second phase of our algorithm, we route from m consecutive inputs to m cubes such that there are no conflicts, we can calculate the total number of links used in routing using the equation for L(C) for each cube. Therefore, the total number of links used in the second phase for m cubes $C_1, C_2, \ldots, C_m$ is:

$$\sum_{i=1}^{i=m} L(C_i)$$

5.4 Internal Links Utilized by the Two-Phase Routing Algorithm

The number of links used in the two-phase routing algorithm only differs from that used in the cube routing in the first phase. The number of links used in the first phase to route m consecutive outputs is:

$$\sum_{i=0}^{i=n-1} \left\lceil \frac{m}{2^i} \right\rceil$$

This number will be $2m-1+n-[\log m]$. The number of links used in the second phase is the same as the number of links used by the cube routing algorithm in the second and third phases. So it can be calculated using links utilized for routing to cubes, function L(C) above.

5.5. Simulation Results

Figure 22:
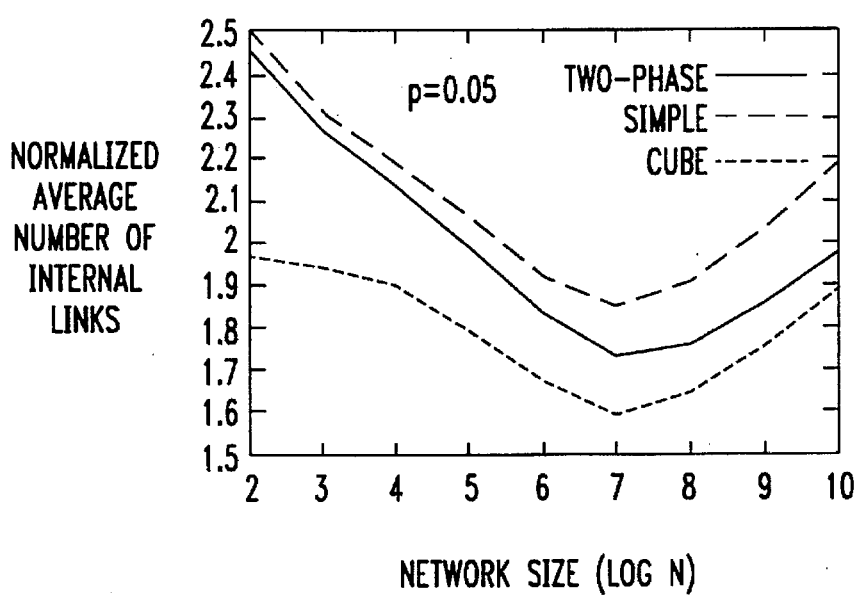
FIG. 22 is a graph showing a comparison of average number of links utilized for p=0.05.
Figure 23:
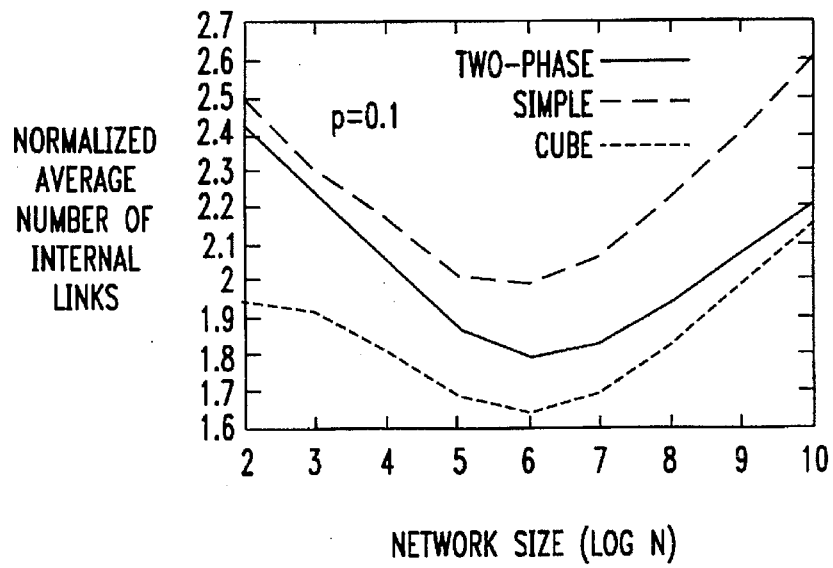
FIG. 23 is a graph showing a comparison of average number of links utilized for p=0.01.
Figure 24:
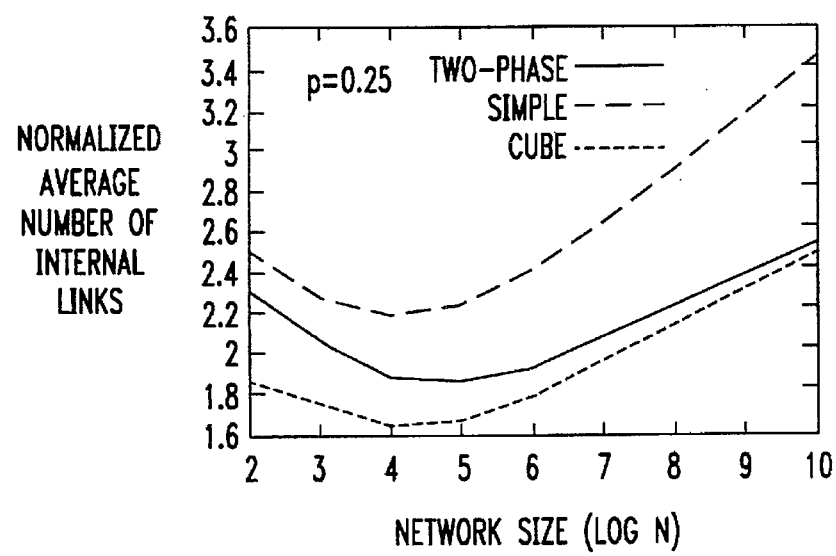
FIG. 24 is a graph showing a comparison of average number of links utilized for p=0.25.

Since it is difficult to analytically compare the number of links used by the two phase algorithm with other routing schemes, we ran extensive simulations with a large number of multicast patterns and compared the performance of our algorithm with the simple two pass algorithm and the hybrid scheme. Our simulation results are show in FIGS. 22, 23, and 24 where we plot the ratio of average number of internal links used by different multicast routing algorithms and that used by the optimal routing algorithm for different parameter values.

Our results show that both the cube routing algorithm and the two phase routing algorithm outperform the simple routing algorithm. This is due to the fact that the simple routing algorithm does not take advantage of the cube property since it merely generates D consecutive outputs in the first phase and sequentially routes from these outputs the desired destinations in a unicast fashion in the second phase. This may in turn indicate that the presence of multicast connections for multistage networks will generally improve the throughput of a network rather than degrade its performance. The difference between the cube routing algorithm and the two phase routing algorithm is, however, marginal, especially when the presence of multicast connections is intense. In general, performance is increased by using cubes as the percentage of destinations in multicast increases. For example, in the case of p=0.25, the cube routing algorithm has, on the average, about 26% performance improvement n comparison with the simple routing g algorithm, while the two-phase routing algorithm shows about 20% improvement. When n=10, the improvement for cube routing is roughly 28% compared with 27% for the two-phase routing.

CONCLUSIONS

The concept of cube (implicant), utilized previously for logic minimization, has been shown to be useful to the problem of multicast routing for general multistage networks. The demonstrated advantages of decomposing a multicast connection into associated cubes are significant. The distance between cubes has enabled the constructing of multicast tree without internal blocking.

The cube routing algorithm has significantly reduced the average number of passes required to accomplish a multicast connection. The potential multicast capability of multistage networks is greatly enhanced through the construction of multicast tree on the basis of cubes, often in the order of exponential increase.

The copy routing algorithm is simple and easy to implement, but does not provide the desired performance. The provision of the initial copies as opposed to the cube routing algorithm has provided the steady performance for the average number of passes, as demonstrated by the combined routing scheme. This performance improvement is however achieved at the expense of slightly increasing the average number of internal links used. The optimal utilization of internal links can be achieved if the average size of multicast connection (the product of p and n) is sufficiently large. This may in turn indicate that the presence of multicast connection for multistage networks will generally improve the throughput of network rather than degrade its performance as we may have first thought. Finally, there are several contributing factors that influence a practical choice of preferable routing algorithms for particular applications. These include network size, the multicast distribution, and performance requirements.

While the foregoing has been described with reference to banyan networks designed as ATM switches, it can more generally be applied to other self-routing multistage networks where they may be used as the interconnection network for multiprocessor or distributed systems.

The present invention can be used in all self-routing multistage switching networks including those that use electronic, optical, or combination type switches. Moreover, while the present invention has been described for switches that use switching elements of degree 2 (e.g., the banyan network of FIG. 2), it can more generally be used with switching elements of degree greater than 2. When a network with switching elements of degree larger than 2 is utilized, the decomposing step would use a multi-value logic minimization procedure to identify cubes. Furthermore, the distance and non-blocking procedure previously described can be generalized in a straightforward manner to such a network. Additionally, the switching element can be unbuffered or buffered and, if buffered, the memory can be dedicated to each input/output or shared among all the inputs and outputs.

Furthermore, while the present invention has been described as using several passes through the same physical network, it could also utilize more than one physical network for implementing the multicast tree. For example, when using a combined routing algorithm, a first separate physical network could be used to generate the copies while a second physical network, connected in series with the first network, may be used for the cube routing algorithm.

Two efficient multicast routing algorithms for cell routing in ATM networks built with self-routing multistage networks have been presented. With simple bit control for each stage, these algorithms use two or three passes to perform any arbitrary multicast. The performance of the routing algorithms have been evaluated in terms of number of internal links used in routing multicasts by analysis and extensive simulation.

The cube routing algorithm needs three passes to complete a multicast, and uses the same routing tag scheme in each pass. In the first pass, it routes from the source to d(<m) outputs, and uses these outputs to route to d cubes in the second phase. It was showed that we can always partition the cubes such that there is a mapping of some instances of the d cubes to the remaining cubes without conflict in the third phase. In the two-phase routing algorithm, the bit control scheme was slightly modified so that we could route from the source to any m consecutive outputs in the first phase. These m outlets are then used as inputs in the second phase for routing to the destination cubes. When the cubes satisfy a certain condition, we showed a method to map each of the m consecutive inputs to route data to one of the cubes of the multicast connection. When some cubes conflict and do not satisfy this condition, we can still route in two passes by expanding a few larger cubes into smaller cubes in order to satisfy this condition for routability.

The performance of the proposed routing algorithms was evaluated in terms of number of internal links used via analysis and extensive simulation. The multicast algorithms using the cubes performed significantly better than the simple routing algorithm which routes to D consecutive outputs in first phase and to final destinations in the second phase. It is very encouraging that the potential multicast capability of multistage networks has been greatly enhanced through the construction of multicast tree on the basis of cubes, and that we can route any arbitrary multicast in no more than three passes through the network regardless of the size of the network. However, there are several contributing factors that influence practical choice of preferable routing algorithms for particular applications. These include network size, the multicast distribution, and performance requirements. The results presented will nevertheless be used as guidelines for the design and analysis of multicast routing algorithms.

While the routing algorithms have been described with reference to Banyan networks designed as ATM switches, it can more generally be applied to other self-routing multistage networks where they may be used as an interconnect for multiprocessor or distributed systems. The self-routing multistage networks can also include those that use electronic, optical, or combination type of switches. Moreover, while our discussions are confined to the usage of switching elements of degree 2, it can be extended to the case of using switching elements of degree larger than 2. In this case, the decomposing step would use a multi-value logic minimization procedure to identify cubes. Furthermore, while the scheme uses the same physical network, it could also utilize more than one physical network. For example, when using the two-phase routing algorithm, a first separate physical network could be used to generate the required m contiguous copies while a second physical network, connected in series with the first network, may be used for cube routing.

What has been described is merely illustrative of the application of the principles of the present invention. Other arrangements and methods can be implemented by those skilled in the art without departing from the spirit and scope of the present invention.

We claim:

1. A method for multicasting an inlet data cell, received as part of an original multicast request, D, at a source, through a self-routing multistage network to a plurality of desired outlets, the method comprising the steps of decomposing the original multicast request, D, defining a set of desired outlets, sending in a first pass from said source said inlet data cell to one set of consecutive outputs, J, wherein destination of said set of consecutive outputs are use as inputs in a second pass, partitioning said set of desired outlets into two groups, I and O, sending said inlet data cell from said destinations in said first pass to cubes of group I, thereby defining said second pass, wherein said cubes are destinations in said network reachable in a single pass, matching each cube in group O to corresponding cubes in group I, and using said matched cubes as inputs to route said inlet cell in at most a third pass.

2. The method of claim 1 wherein said step of partitioning ensures that in I there exists a mapping of said set of consecutive outputs to cubes in O and that a resulting connection pattern is routable without blocking in said network.

3. A method for multicasting an inlet data cell, received as part of an original multicast request, D, at a source, through a self-routing multistage network to a plurality of desired outlets, the method comprising the steps of decomposing the original multicast request, D, defining a set of desired outlets, copying from said source said inlet cell in a first pass to a number M consecutive outputs, wherein destinations of said set of consecutive outputs are used as inputs in a second pass, successively partitioning said inputs and outputs to find a mapping of input cubes to output cubes which has no conflicts in any window, and routing from said M consecutive outputs to output cubes using said successively partitioned mapping, thereby completing said multicast routing in two passes.

4. An apparatus for multicasting an inlet data cell, received as part of an original multicast request, D, at a source, through a self-routing multistage network to a plurality of desired outlets, the apparatus comprising the steps of means for decomposing the original multicast request, D, defining a set of desired outlets, means for sending in a first pass from said source said inlet data cell to one set of consecutive outputs, J, wherein destinations of said set of consecutive outputs are used as inputs in a second pass, means for partitioning said set of desired outlets into two groups, I and O, means for sending said inlet data cell from said destinations in said first pass to cubes of group I, thereby defining said second pass, wherein said cubes are destinations in said network reachable in a single pass, means for matching each cube in group O to corresponding cubes in group I, and means for using said matched cubes as inputs to route said inlet cell in at most a third pass.

5. The apparatus of claim 4, wherein said means for partitioning ensures that in I there exists a mapping of said set of consecutive outputs to cubes in O and that a resulting connection pattern is routable without blocking in said network.

6. An apparatus for multicasting an inlet data cell, received as part of an original multicast request, D, at a source, through a self-routing multistage network to a plurality of desired outlets, the apparatus comprising the steps of means for decomposing the original multicast request, D, defining a set of desired outlets, means for copying from said source said inlet cell in a first pass to a number M consecutive outputs, wherein destinations of said set of consecutive outputs are used as inputs in a second pass, means for successively partitioning said inputs and outputs to find a mapping of input cubes to output cubes which has no conflicts in any window, and means for routing from said M consecutive outputs to output cubes using said successively partitioned mapping, thereby completing said multicast routing in two passes.

7. An apparatus for multicasting an inlet data cell, received as part of an original multicast request at a source, through a self-routing multistage network to a plurality of desired outlets, the apparatus comprising:

inbound and outbound translator means for circulation of a data cell from an output of said translator means back to an input thereof said translator means operable to insert and extract a routing tag to and from said data cell; and switching means coupled between said inbound and outbound translator means operable to implement a tag routing scheme, wherein a cell needed to be recycled for multicast routing will be switched by said switching means back to said inbound translator means for further entry into a switching fabric.

8. The apparatus of claim 7, wherein said switching means is operable as an expander.

9. The apparatus of claim 7, wherein said inbound translator means includes input and internal routing tables.

10. The apparatus of claim 9, wherein said outbound translator means includes output routing tables.

11. The apparatus of claim 7, wherein said switching means is operable as a concentrator.

12. The apparatus of claim 10, wherein routing tag information is calculated based on destinations stored in said routing tables and an incoming data cells finds its routing tag information by operation of table look-up.

13. The apparatus of claim 7, wherein said switching means is a two by two switching element.

* * * * *